(12) United States Patent
Motooka

(10) Patent No.: US 6,844,944 B2
(45) Date of Patent: *Jan. 18, 2005

(54) PHOTOGRAPHIC PAPER EXPOSING METHOD AND AN OPTICAL DIGITAL PRINTER EMPLOYING THIS METHOD

(75) Inventor: Eiji Motooka, Wakayama (JP)

(73) Assignee: Noritsu Koki Co., Ltd., Wakayama-Ken (JP)

( * ) Notice: Subject to any disclaimer, the term of this patent is extended or adjusted under 35 U.S.C. 154(b) by 135 days.

This patent is subject to a terminal disclaimer.

(21) Appl. No.: 10/238,532

(22) Filed: Sep. 10, 2002

(65) Prior Publication Data
US 2003/0001947 A1 Jan. 2, 2003

Related U.S. Application Data

(63) Continuation of application No. 09/249,753, filed on Feb. 16, 1999, now Pat. No. 6,501,570.

(30) Foreign Application Priority Data

Feb. 17, 1998 (JP) .............................. 10-34710

(51) Int. Cl.⁷ ................................ H04M 1/04
(52) U.S. Cl. .................... 358/498; 355/101; 355/27
(58) Field of Search ................ 358/498, 1.12, 358/527; 355/101, 27, 41, 407, 48, 40

(56) References Cited

U.S. PATENT DOCUMENTS

| | | | |
|---|---|---|---|
| 4,309,720 A | 1/1982 | Denham | |
| 4,694,221 A | 9/1987 | Rosier | |
| 5,016,041 A | 5/1991 | Sonobe | |
| 5,049,919 A | 9/1991 | Sakakibara et al. | |
| 6,501,570 B1 * | 12/2002 | Motooka | 358/498 |

FOREIGN PATENT DOCUMENTS

| | | |
|---|---|---|
| EP | 0509406 | 10/1992 |
| EP | 0723182 | 7/1996 |

* cited by examiner

Primary Examiner—Kimberly Williams
Assistant Examiner—Negussie Worku
(74) Attorney, Agent, or Firm—Fulbright & Jaworski L.L.P.

(57) ABSTRACT

An optical digital printer comprising a paper storage (PM1) for storing photographic paper in roll form, a digital printing unit (2) having an irradiating surface (42) for line-exposing the photographic paper based on image data, a developing unit (300) for developing the photographic paper exposed by the digital printing unit, a transport mechanism for transporting the photographic paper along a paper transport line extending from the paper storage to the developing unit, a first paper accommodating box (RB1) disposed between the paper storage (PM1) and the digital printing unit (2), and a second paper accommodating box (RB2) disposed between the digital printing unit and the developing unit (300). The transport mechanism includes a paper loader (20) for feeding the photographic paper transported from the paper storage into the first paper accommodating box, an exposure control roller (44) for drawing the photographic paper from the first paper accommodating box and causing the photographic paper to move past the irradiating surface (42), and, in time of exposure, for causing the photographic paper to move past the irradiating surface while feeding the photographic paper back into the first paper accommodating box, and a paper transport direction switcher (70) for selectively feeding the photographic paper having moved past the irradiating surface, without being exposed, toward the second paper accommodating box, and feeding the photographic paper having moved past and exposed by the irradiating surface toward the developing unit.

3 Claims, 18 Drawing Sheets

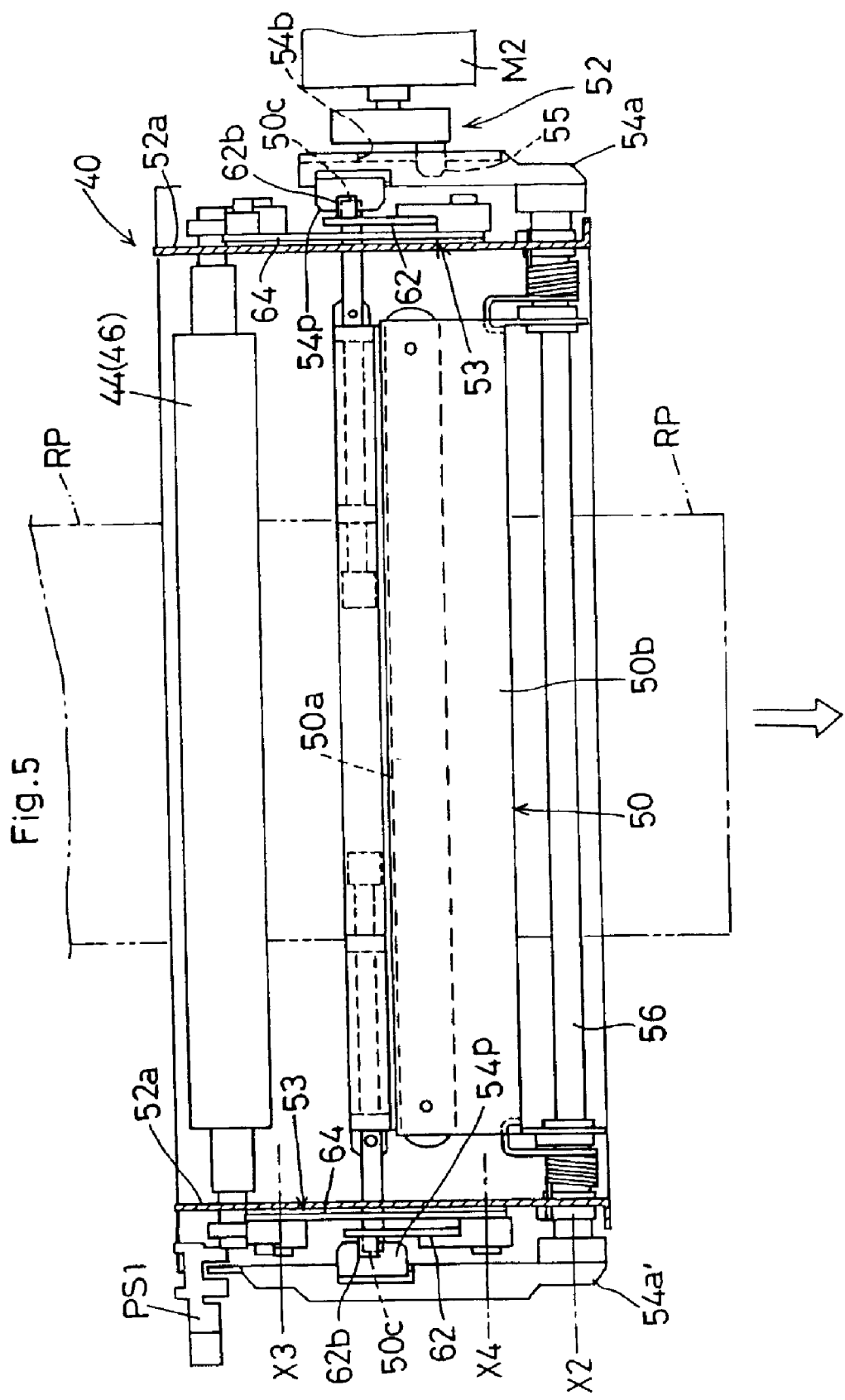

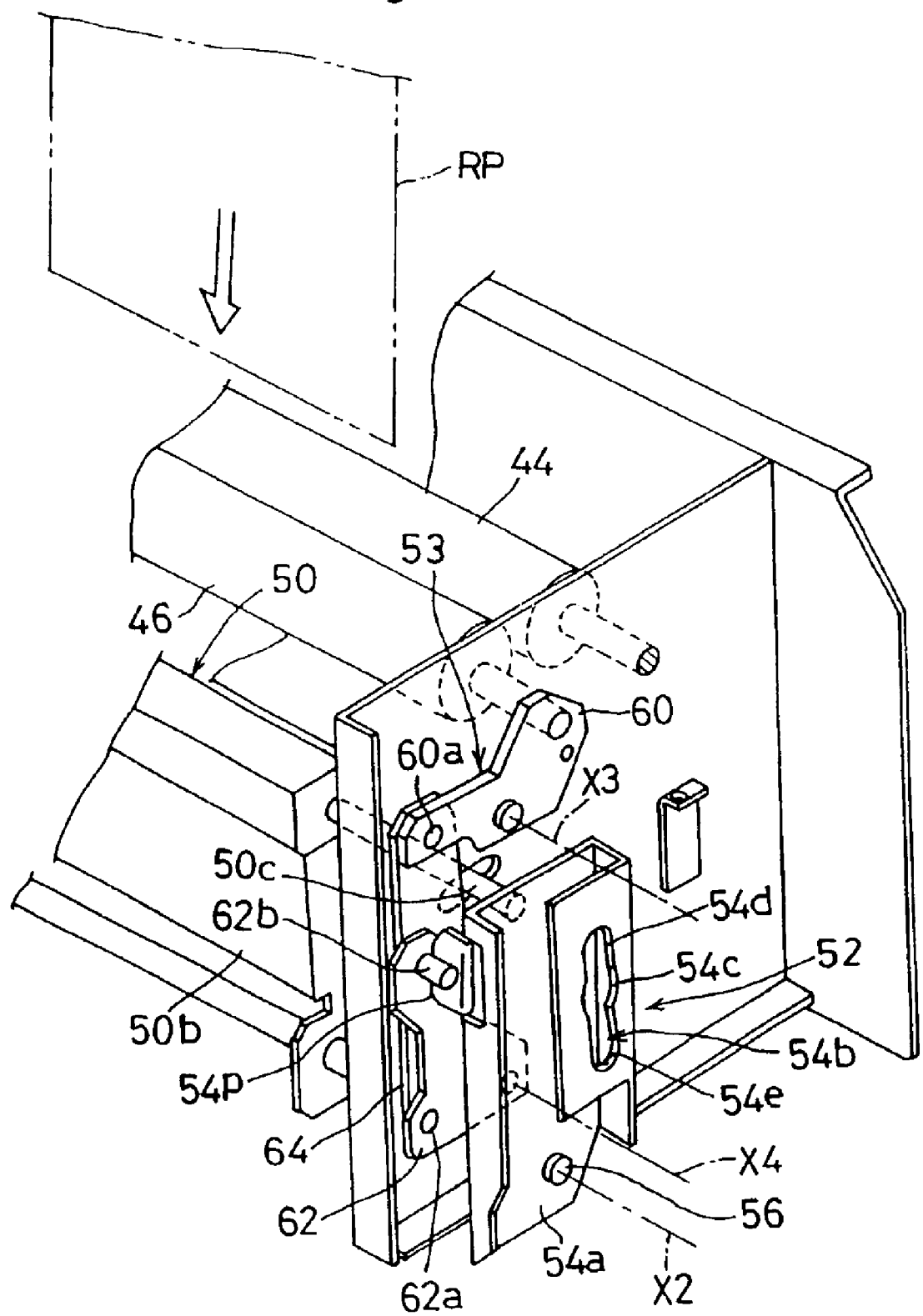

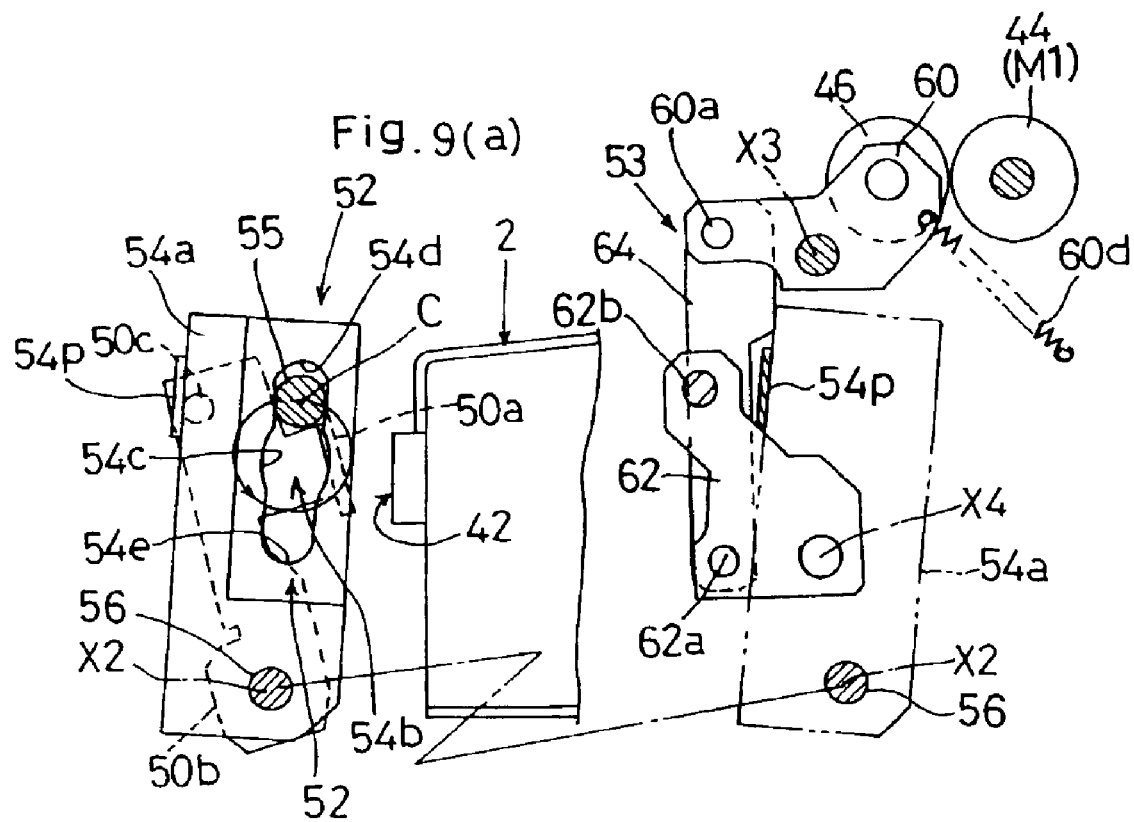
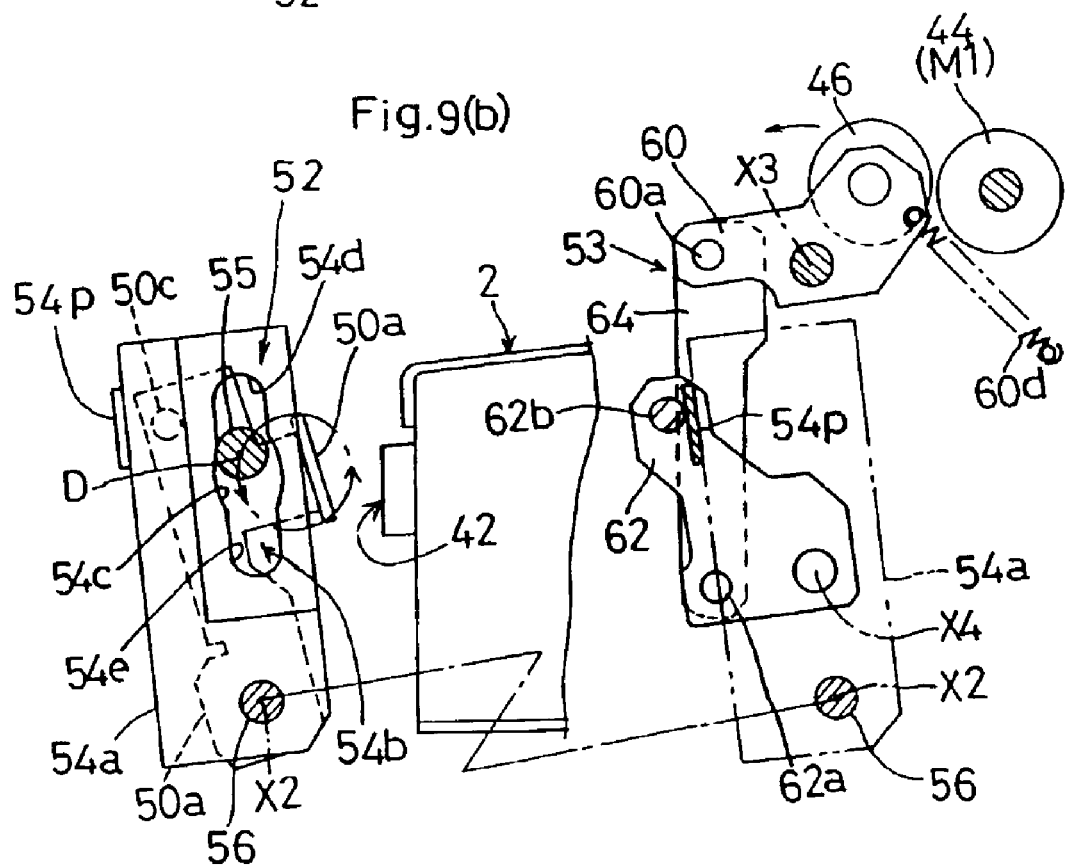

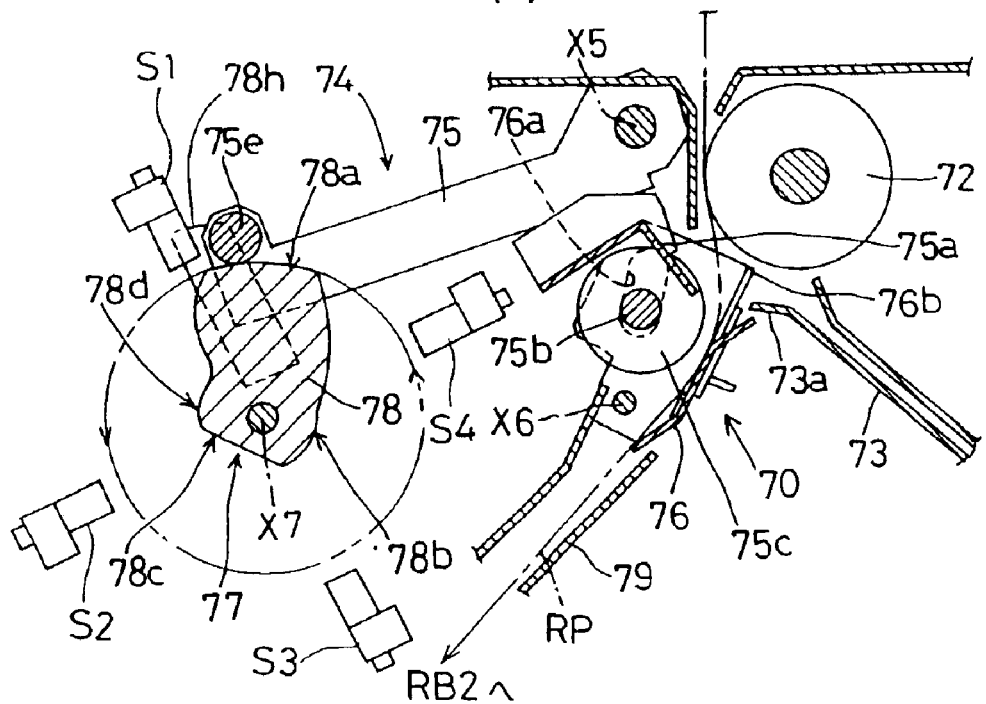
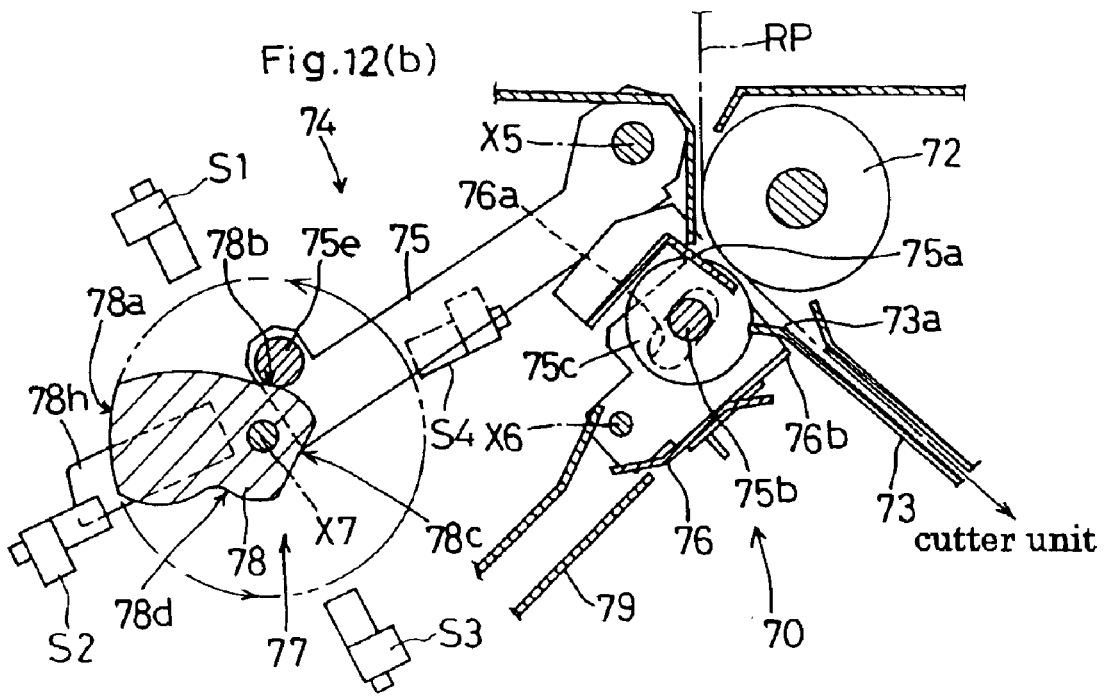

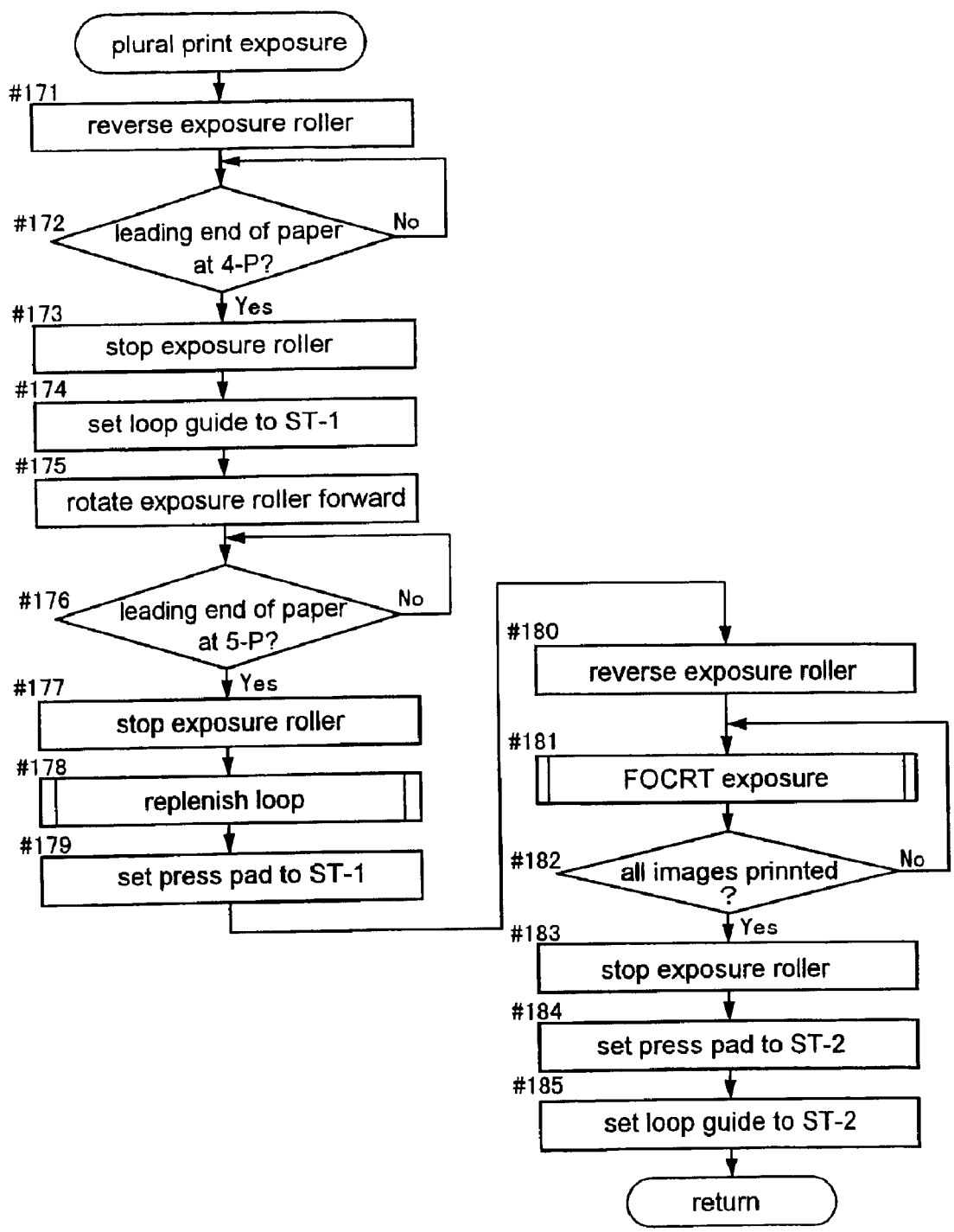

PHOTOGRAPHIC PAPER EXPOSING METHOD AND AN OPTICAL DIGITAL PRINTER EMPLOYING THIS METHOD

This is a continuation of U.S. application Ser. No. 09/249,753, filed Feb. 16, 1999, now U.S. Pat. No. 6,501,570.

BACKGROUND OF THE INVENTION

1. Field of the Invention

This invention relates to a photographic paper exposing method for printing images on photographic paper drawn out of a paper storage by irradiating the paper with light based on image data, and an optical digital printer employing this photographic paper exposing method.

2. Description of the Related Art

In an optical printer of the liquid crystal shutter type or the CRT type, a photosensitive material (which generally is photographic paper and will be referred to hereinafter as such or just as paper) must be positioned accurately in close contact with a beam emitting surface in time of exposure. A printer of the line exposure type, in particular, exposes photographic paper line after line while transporting the photographic paper. In order to print images with a condition to minimize a blank in a forward end region of elongate photographic paper, it is preferable to transport the photographic paper downstream of an irradiating point in an exposure unit once, and then expose the paper while drawing the paper backward.

However, the process of feeding the photographic paper downstream of the exposure unit and drawing the paper backward again to print each image thereon cannot promptly meet a demand for continuously printing a plurality of images on the photographic paper. In former times when digital printing was rare, one index print is added to prints in each order. Today, in an age of digital printing, a photo processing agent prints digital image data obtained from digital cameras and the like on photographic paper. The processing agent is required to process promptly a sudden order for a plurality of digital prints.

SUMMARY OF THE INVENTION

The object of this invention is to provide a technique for quickly printing a plurality of images, which is applicable to an optical digital printer for printing images on photographic paper drawn backward after being fed forward first.

The above object is fulfilled, according to this invention, by a photographic paper exposing method for printing images on photographic paper drawn out of a paper storage by irradiating the photographic paper with light based on image data, while drawing the photographic paper backward. This method comprises a first step, executed for printing a plurality of images on the photographic paper, of feeding the photographic paper by a length sufficient to print the plurality of images, past an irradiating point, a second step of successively printing the plurality of images on the photographic paper at the irradiating point while drawing the photographic paper backward, and a third step of feeding the photographic paper to a paper transport line extending to a developing unit.

With this method, the photographic paper is fed beforehand by a length corresponding to a number of prints to be made, and images are printed successively on the photographic paper as the paper is drawn backward. A plurality of prints are processed more quickly than where the photographic paper is reciprocated for making each print.

In a preferred embodiment of this invention, part of the photographic paper fed at the first step is shunted to a siding line branched from the paper transport line. With this method, even when the photographic paper is fed beforehand by a large length for a plurality of prints, the leading end of the photographic paper may be shunted to the siding line branched from the paper transport line. There occurs no inconvenience of the leading end of the paper moving toward the developing unit and entering a transport line in a cutter unit zone, for example, where a different transport mechanism is dominant. Further, a loop box may be provided for the siding line, the part of the photographic paper shunted to the siding line forming a loop in the loop box. Then, the photographic paper fed beforehand by a large length may be stored in a small space.

In a different preferred embodiment of this invention, the photographic paper on which the plurality of images have been printed at the second step is cut by a cutter unit disposed on the paper transport line, into individual prints to be transported to the developing unit. Thus, a length of photographic paper corresponding to a plurality of prints is never fed to the developing unit. The developing unit may retain an ordinary construction for processing cut paper.

Further, the foregoing object is fulfilled, in another aspect of this invention, by an optical digital printer comprising a transport mechanism for transporting photographic paper along a paper transport line extending from a paper storage to a developing unit, an exposure unit for printing images on the photographic paper transported backward toward the paper storage by the transport mechanism, by irradiating the photographic paper with light based on image data, and a siding line for shunting part of the photographic paper fed by a length sufficient to print the images in the exposure unit, the siding line being branched from the paper transport line downstream of the exposure unit.

With this construction, by utilizing the siding line, the photographic paper is fed beforehand by a length corresponding to a number of prints to be made, and images are printed successively on the photographic paper as the paper is drawn backward. A plurality of prints are processed more quickly than where the photographic paper is reciprocated for making each print.

Other features and advantages of this invention will be apparent from the following description of an embodiment to be taken with reference to the drawings.

BRIEF DESCRIPTION OF THE DRAWINGS

FIG. 5 is a plan view of an exposure controller;

FIG. 8 is a perspective view of a portion of the exposure controller;

FIG. 9 is a schematic view illustrating operation of a first position controlling cam mechanism;

FIG. 12 is a schematic view illustrating operation of a paper transport direction switcher;

FIG. 22 is a flow chart of a processing routine for printing a plurality of images.

DESCRIPTION OF THE PREFERRED EMBODIMENT

One example of optical digital printers employing the method of exposing photographic paper according to this invention will be described as incorporated into a photo processing apparatus.

Overall Construction of Photo Processing Apparatus

Figure 1:
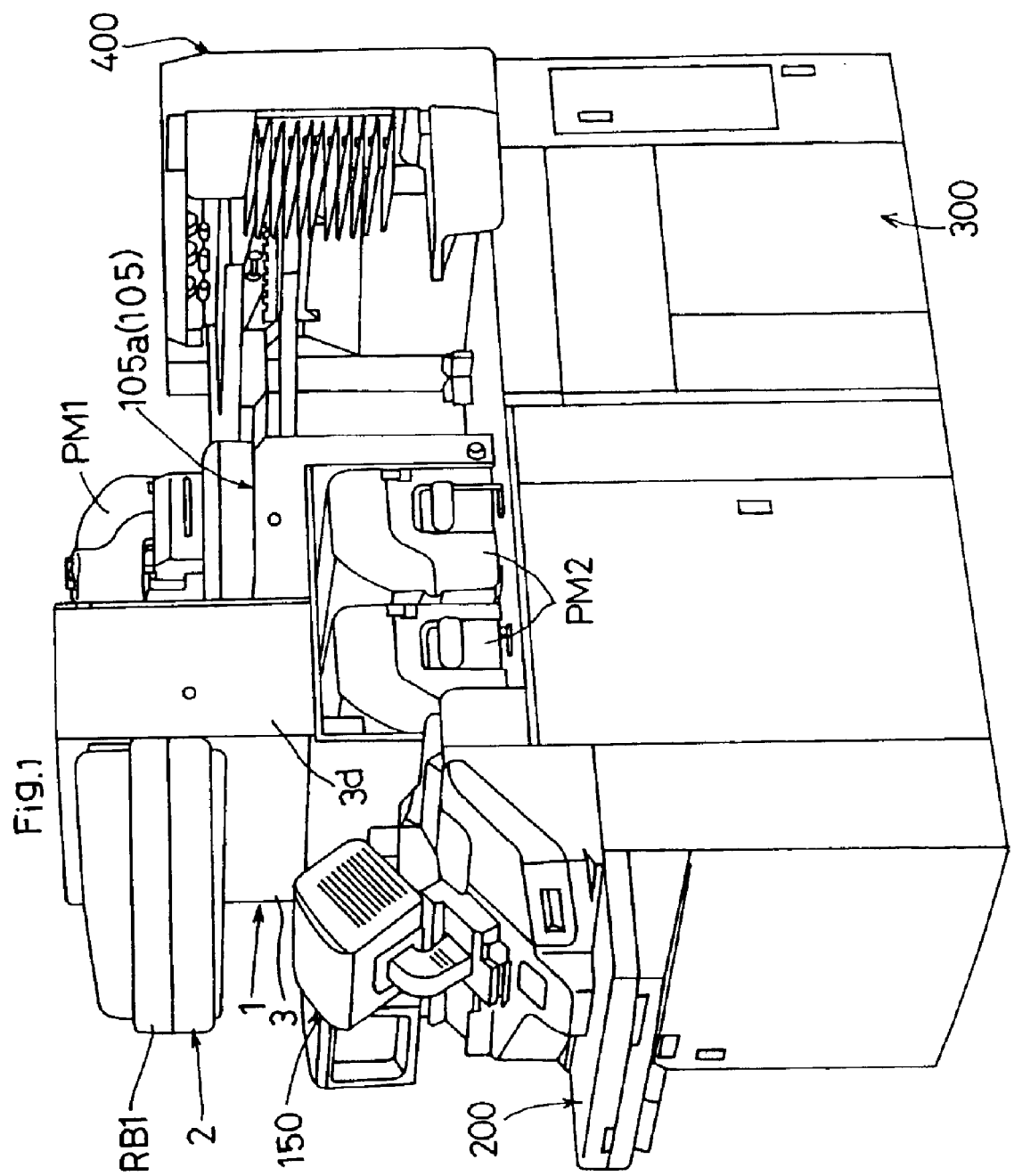
FIG. 1 is a perspective view of a photo processing apparatus employing the technique according to this invention.
Figure 2:
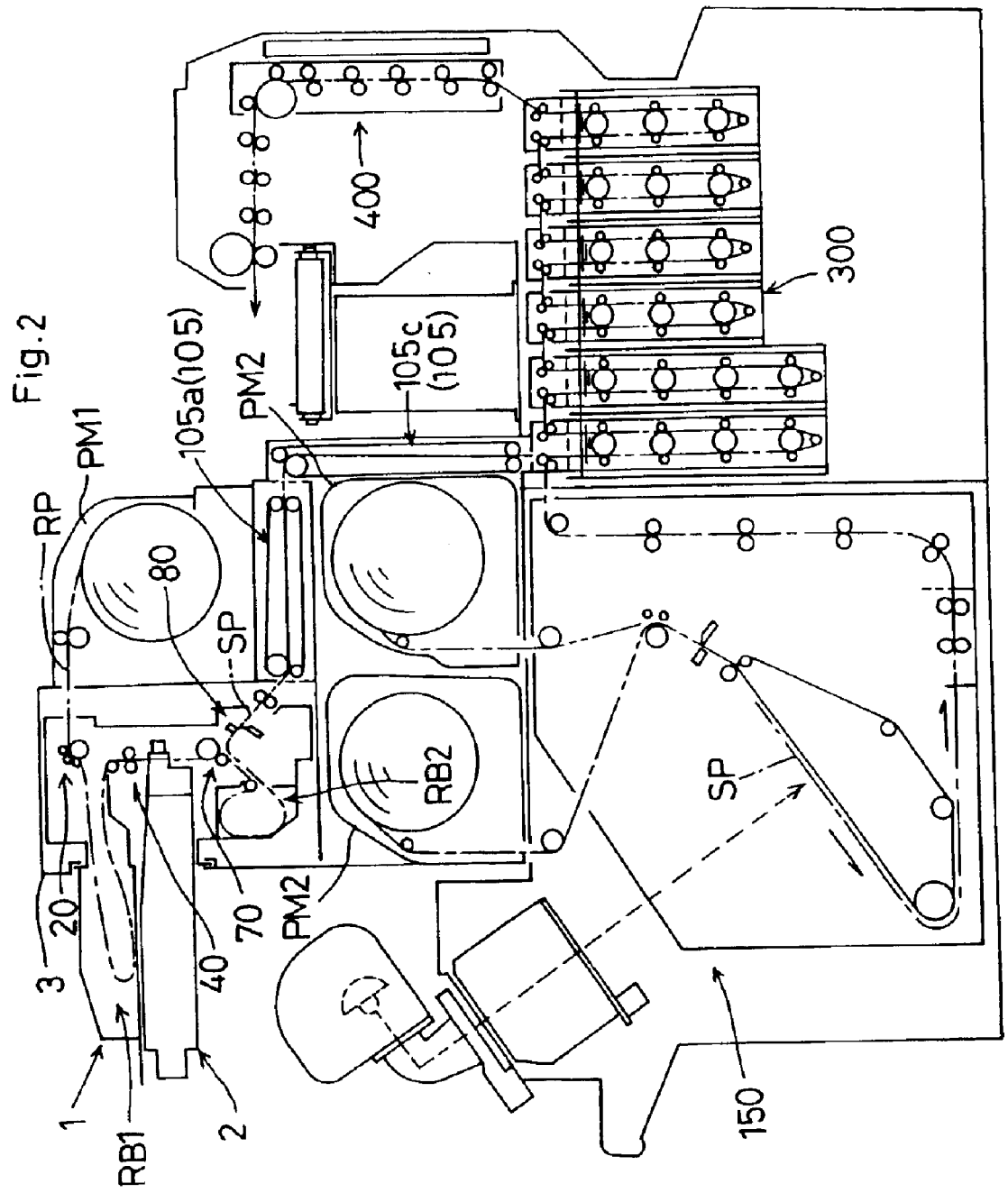
FIG. 2 is a schematic sectional view of the photo processing apparatus shown in FIG. 1.

The photo processing apparatus shown in FIGS. 1 and 2 includes a digital printing unit 1 acting as a digital printer for printing images based on digital data on roll paper RP, a cut paper transport unit 105 for cutting exposed photographic paper and transporting the cut paper SP, a developing unit 300 for passing the exposed and cut paper SP through a plurality of tanks to develop the paper SP with a developer, and a finishing unit 400 for drying developed cut paper SP and arranging the paper SP as finished prints on trays. In this specification, the photographic paper is used as a generic term for photosensitive materials. Elongate photographic paper is referred to herein as roll paper, and photographic paper cut for prints as cut paper.

The photo processing apparatus further includes, arranged leftward of the developing unit 300 as seen from the front, a controller 200 for controlling chiefly operation of digital printing unit 1, and a transmitted light printing unit 150 for printing, on roll paper RP, images acquired as transmitted light from negative films, for example. A paper magazine PM1 is detachably mounted above the cut paper transport unit 105 for feeding the paper RP to the digital printing unit 1. A paper magazine PM2 is detachably mounted below the digital printing unit 1 for feeding the paper RP to the transmitted light printing unit 150.

The digital printing unit 1 has a fiber optical type CRT engine 2 acting as an optical printer for line-exposing the roll paper RP based on digital image data. These digital image data may be acquired by reading, with an image pickup device such as a CCD, images of a film fed to the transmitted light printing unit 150, or may be provided directly by a customer by means of a storage medium such as a floppy disk or MO disk or by personal computer communication. The principle of this type of CRT printer is well known, and is described in U.S. Pat. No. 4,309,720, for example.

Outline of Digital Printing Unit

Figure 3:
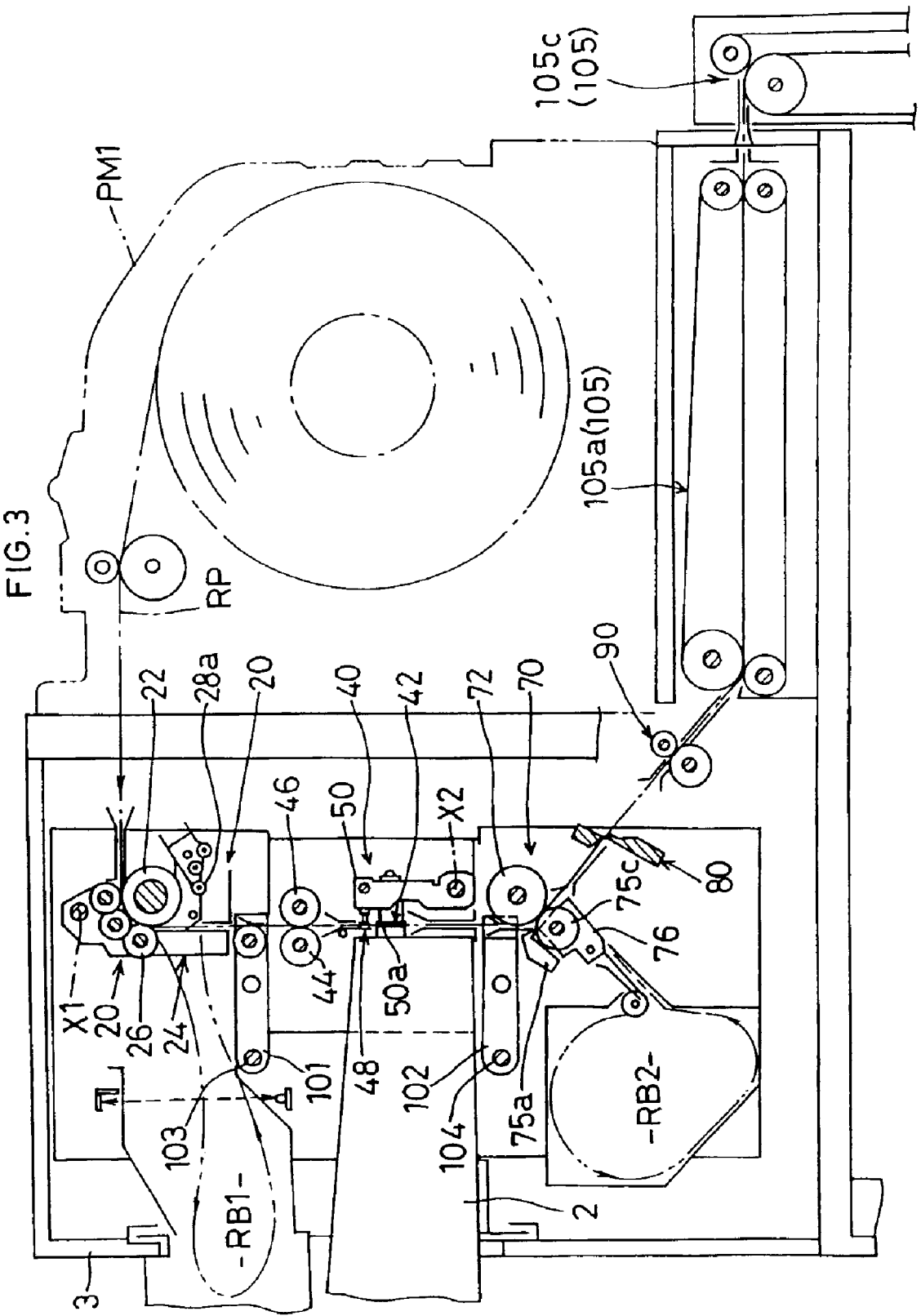
FIG. 3 is a schematic sectional view of a digital printing unit.

As shown in FIG. 3, the digital printing unit 1 includes a paper loader 20 for drawing the roll paper RP from the paper magazine PM1 and feeding it to the digital printing unit 1, an exposure controller 40 disposed adjacent the center of digital printing unit 1, and a paper transport direction switcher 70.

The paper loader 20 disposed adjacent an upper end of digital printing unit 1 has a first feed roller 22, and a first path switching guide 24 for forming a photographic paper loop in a first loop box RB1 provided above the CRT engine 2. The paper transport direction switcher 70 disposed downstream of the exposure controller 40 has a second feed roller 72 for feeding the roll paper RP to a cutter unit 80, and a second path switching guide 74 for forming a siding loop, as necessary, in a second loop box RB2 disposed level with the cutter unit 80. The second loop box RB2 is provided as a siding line for temporarily storing the roll paper RP fed beforehand for exposure purposes.

In the exposure controller 40, a tube surface 42 formed at an end of CRT engine 2 projects to a paper transport line. Light beams excited by electron beams emitted from an electron gun in CRT engine 2 exit the tube surface 42 and irradiate the emulsion surface of roll paper RP transported as pressed against the tube surface 42, to print images. The tube surface 42 acts as a device for exposing the photographic paper. Further, the exposure controller 40 includes an exposure control roller 44, and a press roller 46 for pinching the roll paper RP with the exposure control roller 44. The roll paper RP once transported to the cutter unit 80 or second loop box RB2 is drawn back upward at an accurate speed past the front of tube surface 42 by the exposure control roller 44, to be exposed by the CRT engine 2 driven synchronously with the exposure control roller 44. A paper centering mechanism 100 is disposed immediately before and after the exposure controller 40 for transversely centering the roll paper RP relative to the tube surface 42 of CRT engine 2.

The digital printing unit 1 is mounted in a light-shielding box 3 for providing a darkroom condition for the roll paper RP drawn out of the paper magazine PM1 for exposure. A draw-out mechanism is provided for drawing the digital printing unit 1 out of the light-shielding box 3 at non-exposure times, to allow an inspection and maintenance thereof in lightroom condition. The cut paper transport unit 105 disposed adjacent and downstream of the digital printing unit 1 transports cut paper SP in the form of prints, as pinched between two opposed conveyor belts.

Construction of Paper Loader

Figure 4A:
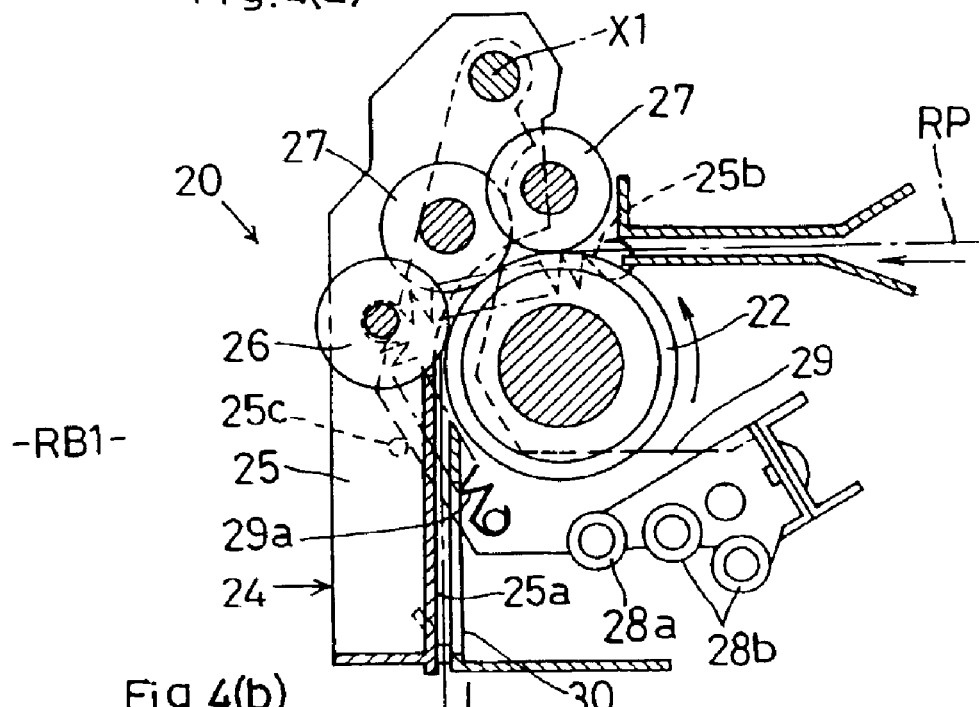
FIG. 4 is a schematic view illustrating operation of a paper loader.
Figure 4B:
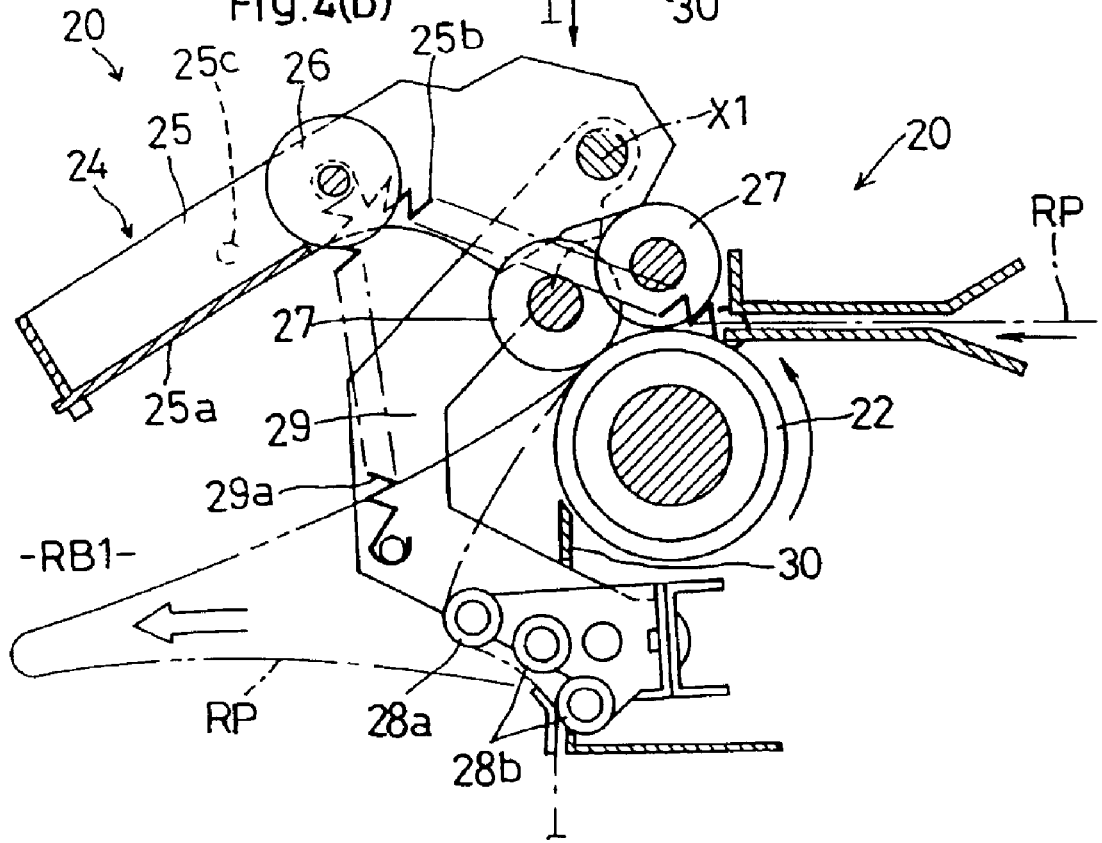

As shown in FIG. 4, the paper loader 20 includes the first feed roller 22 and first path switching guide 24 as main components thereof. The first feed roller 22 is rotatable by a motor, not shown, about an axis parallel to an axis of the roll paper RP in the paper magazine PM1. The first path switching guide 24 has a swing arm 25 vertically pivotable about an axis X1 parallel to the first feed roller 22. The swing arm 25 rotatably supports a first press roller 26 attached adjacent an upper end thereof, and a loop roller 28a and an auxiliary loop roller 28b adjacent a lower end.

The swing arm 25 defines a loading guide surface 25a extending straight. The swing arm 25 is pivotable by an actuator such as a rotary solenoid between a loading position in which the loading guide surface 25a extends substantially vertically, and a loop position in which the loading guide surface 25a is swung upward. The swing arm 25 is biased to the loading position by a coil spring 25b (with one end thereof fixed to the main body of the photo processing apparatus, and the other end fixed to the swing arm 25) having an elastic restoring force weaker than an operating force of the actuator.

When the swing arm 25 takes the loading position, the loading guide surface 25a forms a vertical paper loading path with a fixed guide surface 30. At this time, the first press roller 26 is pressed against a peripheral surface of the first feed roller 22, with a tangent between these rollers extending substantially vertically (also along the loading guide surface 25a). Consequently, when the first feed roller 22 is rotated forward in this state, the roll paper RP is drawn out of the paper magazine PM1 as pinched between the first feed roller 22 and the first press roller 26, and guided to the paper loading path formed by the loading guide surface 25a to be loaded into the exposure controller 40

On the other hand, when the swing arm 25 takes the loop position, the loading guide surface 25a and the first feed roller 22 are swung upward to form a large opening to the first loop box RB1. Since the first press roller 26 is spaced from the first feed roller 22 at this time, the roll paper RP is directed toward the first loop box RB1 by other press rollers 27 remaining pressed against the first feed roller 22. Further, the loop roller 28a (which, in the loading position, is retracted toward the paper magazine PM1 so as not to interfere with the roll paper RP) moves into the first loop box RB1 to lie on the paper loading path.

Consequently, when the loop position is taken and the first feed roller 22 is rotated forward again, with the exposure control roller 44 and press roller 46 gripping part of the roll paper RP having been loaded vertically to the exposure controller 40 in the foregoing step, the roll paper RP newly fed from the paper magazine PM1 is guided into the first loop box RB1 to be stored therein as a basic loop. After the basic loop is formed in this way, the exposure control roller 44 may be rotated backward while maintaining the swing arm 25 in the loop position and the first feed roller 22 still. Then, the roll paper RP moving backward is guided into the first loop box RB1 by the auxiliary loop roller 28b on the swing arm 25 to form part of the loop in the loop box RB1.

With the presence of such a basic loop, the roll paper RP is drawn from the loop, instead of being drawn out of the paper magazine PM1, in feeding a length of roll paper RP necessary for exposure downstream with respect to the transport direction of the exposure controller 40 (toward the developing unit) as a preparation for an exposing operation. The roll paper RP returning in time of exposure is absorbed by this loop.

The loop roller 28a and auxiliary loop roller 28b are further rotatably supported by an arm member 29 which is in turn supported by the swing arm 25 to be pivotable fore and aft about the axis X1. A coil spring 26a is attached between the swing arm 25 and arm member 29 for biasing the arm member 29 toward the first loop box RB1. When the swing arm 25 takes the loop position to move the loop roller 28a into the first loop box RB1, a strong force (due to paper jamming or other cause) may act on the loop roller 28a from the first loop box RB1. Then, the loop roller 28a can be retracted with the arm member 26 past the fixed guide surface 30 toward the paper magazine PM1. However, when the swing arm 25 is in the loading position, the loop roller 28a should be retracted from the paper loading path against the biasing force of coil spring 26a. For this purpose, the swing arm 25 has a stopper 25c for stopping pivotal movement of arm member 29 at a predetermined angle.

As noted above, the swing arm 25 is biased to the loading position by the coil spring 25b. When, with the first path switching guide 24 in the loading position, the roll paper RP should jam the loading path, the swing arm 25 is swung to the loop position against the biasing force of coil spring 25b. In the paper loader 20, the first press roller 26 and the first feed roller 22 constitute main components of a paper transport mechanism.

Construction of Exposure Controller

As shown in FIGS. 5 through 8, the exposure controller 40 includes, besides the tube surface 42 of CRT engine 2, the exposure control roller 44 formed of metal (such as aluminum) and driven by a step motor M1, and the press roller 46 formed of a layer of synthetic rubber such as NBR covering a core, a paper bypass mechanism 48 for separating the roll paper RP from the tube surface 42 except in time of exposure control, and a press pad 50a for pressing the roll paper RP against the tube surface 42 in time of exposure control.

The press roller 46 is movable between a press position pressed against the exposure control roller 44 to pinch the roll paper RP and a release position separated from the exposure control roller 44 to release the roll paper RP. The press pad 50a is similarly switchable between a press position for pressing the roll paper RP against the tube surface 42 and a release position. Both the press roller 46 and press pad 50a are movable to the respective positions under control of a first position controlling cam mechanism 52 provided for the exposure controller 40.

The first position controlling cam mechanism 52 includes a box-like main body 52a supporting the exposure control roller 44 at opposite ends thereof, a pair of first pivotable pieces 60 supported by the main body 52a and rotatably supporting the press roller 46 at opposite ends thereof, a pair of pivotable plates 54a and 54a' pivotable about an axis X2 adjacent the lower end of main body 52a, and a bearing 55 rotatably disposed in a position cranked from a rotary shaft of a DC motor M2. The first pivotable pieces 60 are supported to be pivotable about an axis X3 extending through the main body 52a. The pivotable plates 54a and 54a' and the first pivotable pieces 60 are operatively interconnected through link mechanisms 53. The pair of pivotable plates 54a and 54a' are rigidly connected to each other through a common horizontal rod 56 pivotable about the axis X2. The bearing 55 is slidable in a slot 54b formed in one of the pivotable plates 54a.

The slot 54b defines an arcuate cam 54c having the same curvature as an outermost circle described by the bearing 55 in revolution, a first straight cam 54d extending upward from the arcuate cam 54c and having a width approximately corresponding to an outside diameter of bearing 55, a second straight cam 54e extending from the arcuate cam 54c in an opposite direction to the first straight cam 54d.

Each link mechanism 53 includes, besides the first pivotable piece 60, a second pivotable piece 62 pivotable about an axis X4 disposed between axis X2 and axis X3, and a link arm 64 for coupling one end 60a of the first pivotable piece 60 and one end 62a of the second pivotable piece 62. A pivotal movement of the pair of first pivotable pieces 60 produces either the press position or the release position of the press roller 46. The press roller 46 is constantly biased to the press position by right and left coil springs 60c and 60d individually connected to the pair of first pivotable pieces 60.

The press pad 50a also is supported, separately from the first pivotable pieces 60 and pivotable plates 54a and 54a', by a pivotable member 50b pivotable about the axis X2, and is biased by a torsion spring to the release position away from the tube surface 42. On the other hand, the pivotable member 50b has engaging pins 50c extending from opposite, right and left ends thereof to positions above the press pad 50a for engaging engageable portions 54p of the pair of pivotable plates 54a and 54a'.

When the DC motor M2 rotates forward, the first position controlling cam mechanism 52 successively exhibits the following states in response to the revolution of bearing 55.

In a first state shown in FIG. 9(a), which occurs when the bearing 55 is at point A on an orbit of revolution, the bearing 55 in the slot 54b lies adjacent the entrance of the second straight cam 54e. As a result, the pivotable plates 54a maintain a substantially vertical posture. In this first state, no force is applied from the pivotable plates 54a to the link mechanisms 53 or first pivotable pieces 53a. The press roller 46 is pressed against the exposure control roller 44 by the coil springs 60c and 60d. On the other hand, the press pad 50a is separated from the tube surface 42 by the biasing force of the torsion spring since the engaging pins 50c are disengaged from the pivotable plates 54a.

In a second state shown in FIG. 9(b), which occurs when the bearing 55 revolves slightly forward (counterclockwise) from point A to point B on the orbit of revolution, the bearing 55 is inside the arcuate cam 54c of the slot 54b. As a result, the pivotable plates 54a maintain a posture inclined to a large degree toward the tube surface 42. In this second state also, no force is applied from the pivotable plates 54a to the link mechanisms 53 or first pivotable pieces 53a. The press roller 46 remains in the press position. On the other hand, the press pad 50a is now pressed against the tube surface 42 by the engaging pins 50c engaging the engageable portions 54p of pivotable plates 54a. The exposure control is executed in this second state with the roll paper RP pressed against the tube surface 42.

Figure 10A:
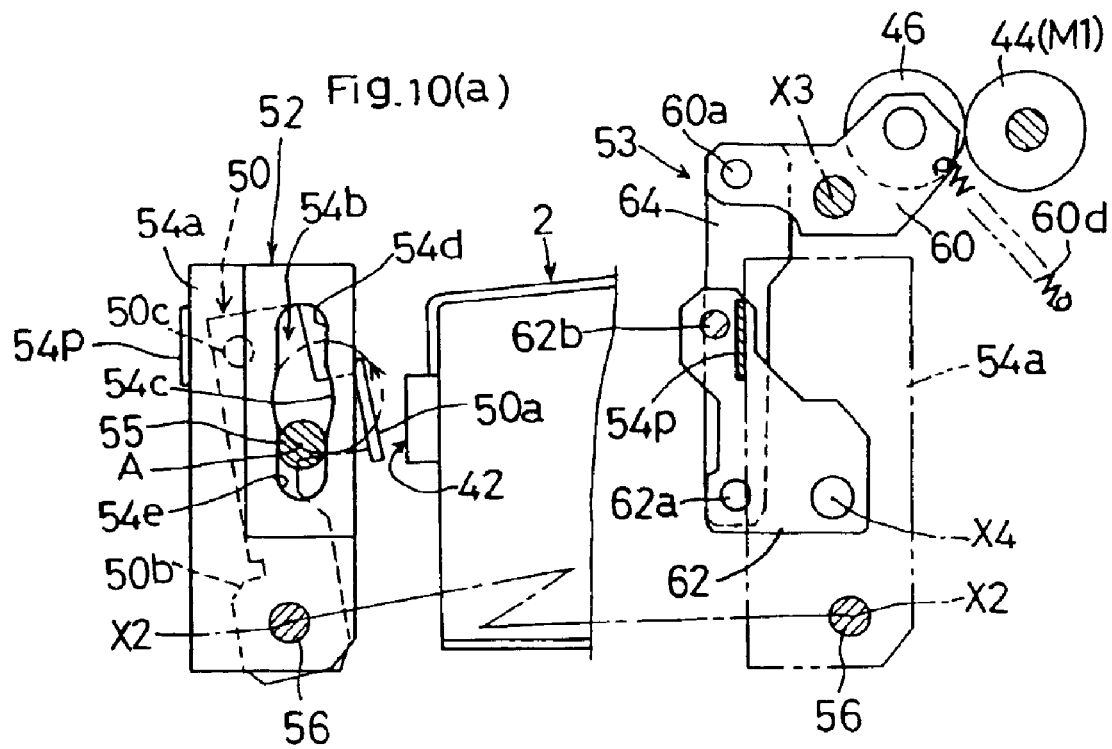
FIG. 10 is a schematic view illustrating operation of the first position controlling cam mechanism.

In a third state shown in FIG. 10(a), which occurs when the bearing 55 revolves further forward from point B to point C on the orbit of revolution, the bearing 55 is inside the first straight cam 54d of the slot 54b. As a result, the pivotable plates 54a maintain a posture slightly inclined toward the tube surface 42. This third state presents a situation similar to the first state. That is, the press roller 46 remains in the press position, but the press pad 50a is returned to the position separated from the tube surface 42 with the engaging pins 50c in engagement with the engageable portions 54p and retracted away from the tube surface 42.

Figure 10B:
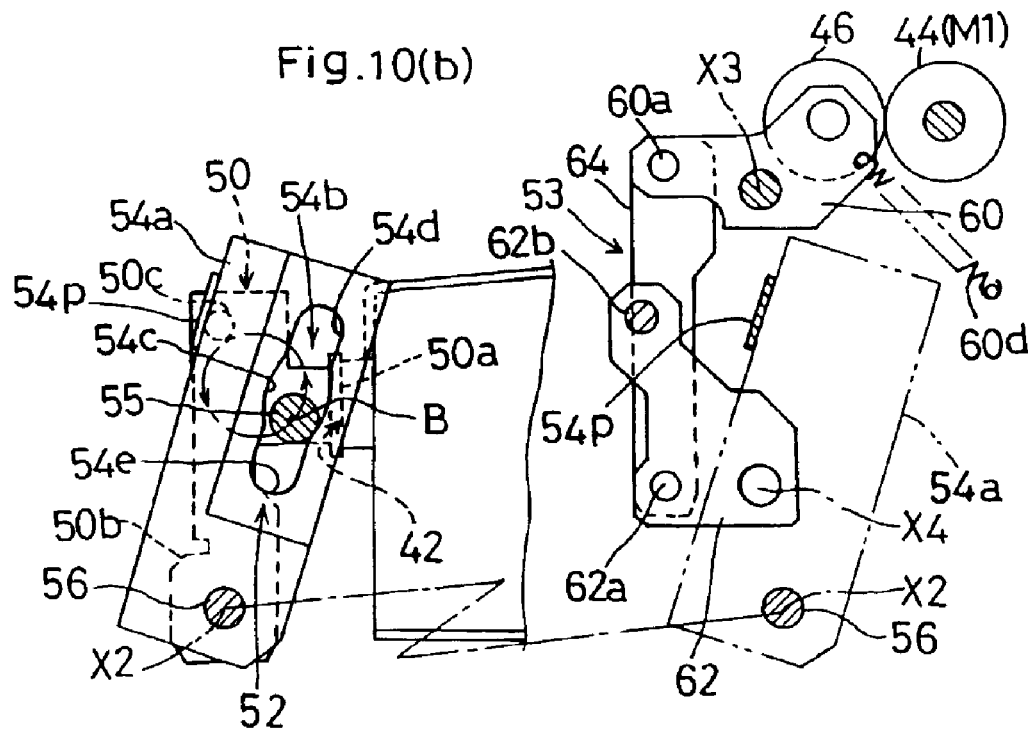

In a fourth state shown in FIG. 10(b), which occurs when the bearing 55 revolves slightly forward from point C to point D on the orbit of revolution, the bearing 55 is inside the arcuate cam 54c of the slot 54b. As a result, the pivotable plates 54a maintain a posture slightly inclined away from the tube surface 42. In this fourth state, the press pad 50a remains separated from the tube surface 42, but the press roller 46 is separated from the exposure control roller 44. That is, in the fourth state, side surfaces of the pivotable plates 54a act on points of application 62b formed on the second pivotable pieces 62 to tilt the second pivotable pieces 62 downward about the axis X2. With the tilting of the second pivotable pieces 62, ends 62a of the second pivotable pieces 62 are displaced downward. The link arms 64 connected at lower ends thereof to the ends 62a of the second pivotable pieces 62 are also displaced downward while tilting slightly. With the downward displacement of link arms 64, the ends 60a of the first pivotable pieces 60 are displaced downward about the axis X3. Consequently, the press roller 46 is separated from the exposure control roller 44 against the biasing force of coil springs 52c and 52d. The press roller 46 in the position pressed against the exposure control roller 44 is detectable by a sensor PS3. On the other hand, the press roller 46 released from the press position is detectable by a sensor PS1. In this fourth state, an operation may be carried out for loading the roll paper RP into the exposure controller 40 in preparation for the exposure control. The arcuate cam 54c which contacts the bearing 55 in the above second and fourth states has the same curvature as an outermost circle described by the bearing 55 in revolution as noted hereinbefore. Thus, even when the DC motor M2 and bearing 55 stop after slightly overrunning a predetermined position, the posture of pivotable plates 54a is unaffected.

Figure 11A:
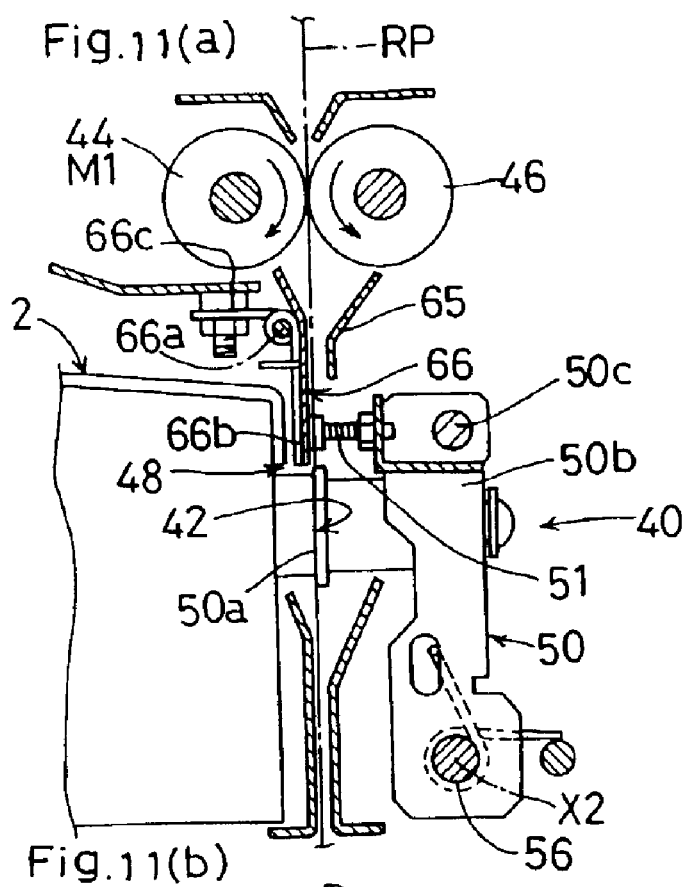
FIG. 11 is a schematic view illustrating operation of a paper bypass mechanism.
Figure 11B:
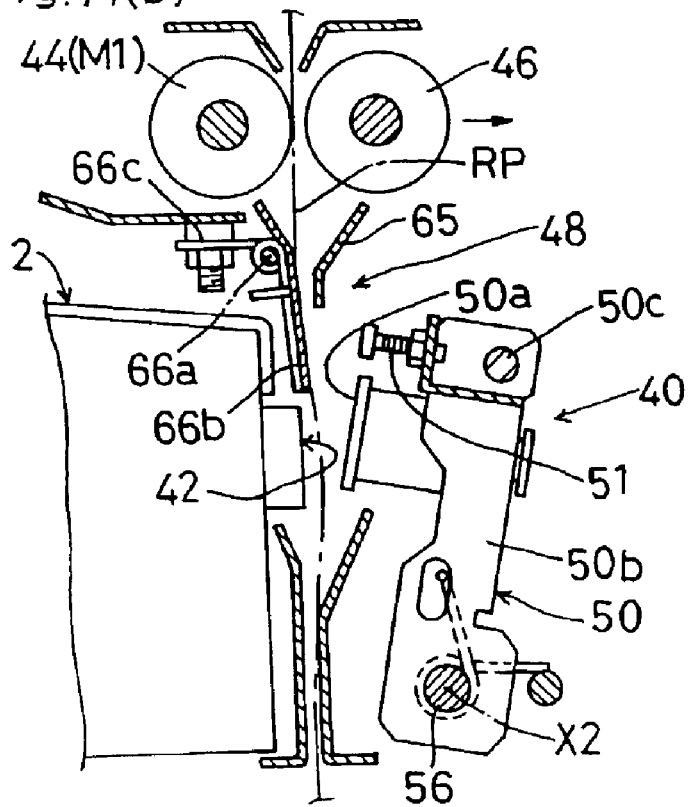

As shown in FIGS. 11(a) and (b), a pair of guides 65 and 66 are disposed under the press roller 46 and exposure control roller 44 to act as the paper bypass mechanism for guiding the roll paper RP to the front of the tube surface 42. One of the guides is a fixed guide 65 and the other a movable guide 66 pivotable about an axis 66a. The movable guide 66 is pivotable between an exposure position with a lower end 66b retracted away from the tube surface 42 toward the main body of CRT engine 2 for cooperating with the fixed guide 65 to guide the roll paper RP to a path for contacting the tube surface 42, and a bypass position with the lower end 66b protruding from the tube surface 42 for guiding the roll paper RP out of contact with the tube surface 42. That is, in the bypass position, the roll paper RP may be fed at high speed (with no possibility of damage done through contact with the tube surface 42) from a gap between the press roller 46 and exposure control roller 44 to the paper transport direction switcher 70 disposed downstream of the exposure controller 40, and to the cutter unit 80 disposed further downstream.

The movable guide 66 is normally maintained in the bypass position by a torsion spring 66c, and is switched to the exposure position when the exposure control is required. That is, in the exposure control, the first position control cam mechanism 52 first switches from the fourth state to the first state for causing the press roller 46 to press the roll paper RP against the exposure control roller 44. When the first position control cam mechanism 52 subsequently switches to the second state, the pivotable member 50b is inclined toward the tube surface 42 for causing the press pad 50a to press the roll paper RP against the tube surface 42. When the pivotable member 50b is inclined, an interlocking pin 51 disposed adjacent an upper end of pivotable member 50b pushes the lower end 66b of movable guide 66 toward the main body of CRT engine 2. As a result, the movable guide 66 is switched to the exposure position against the biasing force of torsion spring 66c.

In time of exposure control with the first position control cam mechanism 52 in the second state, the press roller 46 presses the roll paper RP on the peripheral surface of exposure control roller 44 based on the biasing force of two (i.e. right and left) coil springs 60c and 60d connected respectively to the pair of pivotable pieces 52b as described hereinbefore. A biasing force adjusting mechanism is provided to correct and equalize different biasing forces (i.e. elastic restoring forces), if any, of the right and left coil springs 60c and 60d.

Figure 6:
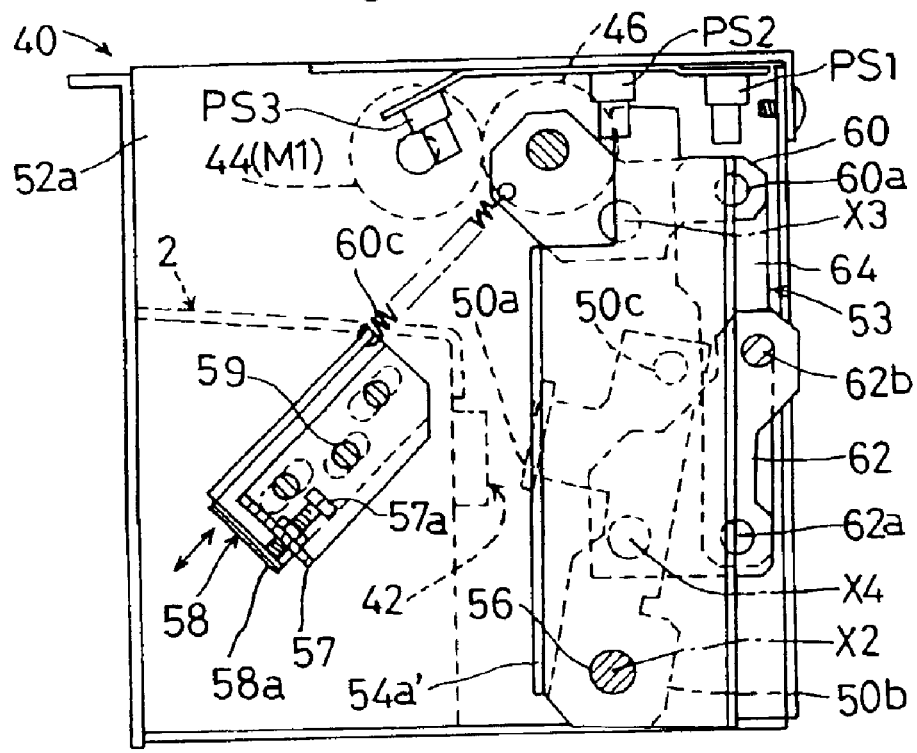
FIG. 6 is a left side view of the exposure controller.
Figure 7:
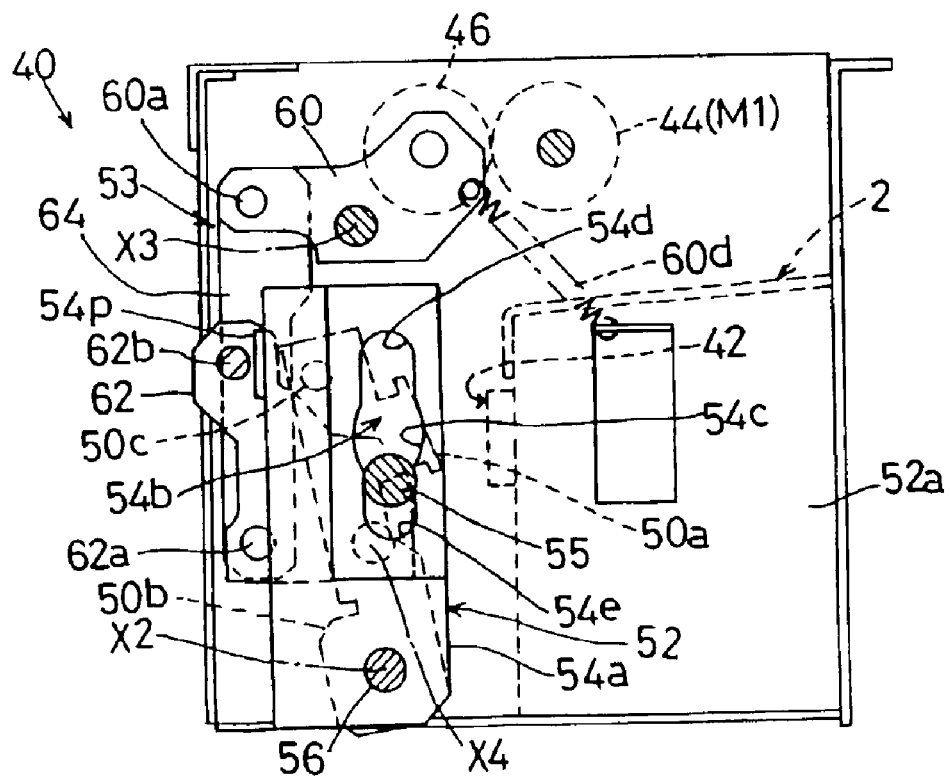
FIG. 7 is a right side view of the exposure controller.

In this embodiment, the biasing force adjusting mechanism is provided only for the coil spring 60c disposed closer to the front of the photo processing apparatus. As shown in FIG. 6, the biasing force adjusting mechanism includes a fixed plate 57 which may be fixed to the box-like main body 52a of the first position control cam mechanism 52, and a movable plate 58 movable relative to the fixed plate 57 along a direction of expansion of the coil spring 60c. The direction of movement of the movable plate 58 relative to the fixed plate 57 is limited to the direction of expansion of the coil spring 60c by two screws projecting through the fixed plate 57 toward the main body 52a and slots formed in the movable plate 58 for receiving these screws. By tightening these two screws, the movement of the movable plate 58 relative to the fixed plate 57 is restricted. The movable plate 58 has a contact piece 58a for contacting a forward end of an adjusting screw 57a.

One end of coil spring 60c is connected to the movable plate 58. The movable plate 58 is constantly biased toward the press roller 46 by the coil spring 60c. The position of movable plate 58 relative to the fixed plate 57 is determined by an amount of projection of the forward end of adjusting screw 57a toward the contact piece 58a. Thus, after loosening the two screws fixing the movable plate 58 to the fixed plate 57, the adjusting screw 57a may be advanced on the fixed plate 57 to increase the amount of projection of the forward end of adjusting screw 57a from the fixed plate 57. Then, the movable plate 58 is moved away from the press roller 46, thereby substantially increasing the elastic restoring force of coil spring 60c. When the adjusting screw 57a is moved in the opposite direction, the movable plate 58 is moved toward the press roller 46 by the biasing force of coil spring 60c, thereby resetting the coil spring 60c to a substantially low elastic restoring force. Further, a lock nut 59 is provided on the fixed plate 57 as a coarse adjusting device to varying the position of the fixed plate 57 relative to the box-like main body 52a. In the exposure controller 40, the press roller 46 and exposure control roller 44 constitute main components of the paper transport mechanism.

Construction of Paper Transport Direction Switcher

In the paper transport direction switcher 70, the paper transport line downstream of the exposure controller 40 is branched to a transport line to the cutter unit 80 and a siding line to the second loop box RB2. One of these lines is selected by the second path switching guide 74.

As shown in FIGS. 12(a) and (b), the second path switching guide 74 includes a control arm 75 pivotable about a fixed axis X5, and a loop guide 76 pivotable about an axis X6. The control arm 75 has a cutter guide 75a and a pivotal axis 75b fixed thereto. A second press roller 75c is rotatably mounted on the pivotal axis 75b. With a pivotal movement of control arm 75, a guide surface formed on the cutter guide 75a is placed to extend along the transport line to the cutter unit 80. Then, the second press roller 75c presses the roll paper RP against the second feed roller 72. The loop guide 76 independent of control arm 75 and pivotable about the axis X6 defines straight slots 76a for receiving the pivotal axis 75b. With this construction, a pivotal movement of control arm 75, and thus a movement of pivotal axis 75b, causes the loop guide 76 to pivot about the axis X6. The loop guide 76 also defines a guide surface for guiding the roll paper RP. With a pivotal movement of loop guide 76, this guide surface is placed to extend along the fixed guide 79 leading to the second loop box RB2.

The movement of loop guide 76 relative to the control arm 75 is limited by the slots 76a. When the axis 75b moves arcuately about the axis X5 with a pivotal movement of control arm 75, the loop guide 76 is forcibly swung about the axis X6, thereby to direct the leading end of roll paper RP to a selected path.

As described above, the pivotal movement of control arm 75 determines control positions of cutter guide 75a, loop guide 76 and second press roller 75c. Such pivotal movement of control arm 75 is achieved with a second position control cam mechanism 77. The second position control cam mechanism 77 includes a point of application 75e formed at a free end of control arm 75 to act as a cam follower, and a cam 78 rotatable stepwise through fixed angular intervals about an axis X7.

The point of application 75e is formed of a ball bearing to have a rotatable periphery. The control arm 75 is biased by a torsion coil spring mounted on the axis X5 so that the point of application 75e constantly lies adjacent the axis X7 of cam 78. The cam 78 has a first cam surface 78a, a second cam surface 78b, a third cam surface 78c and a fourth cam surface 78d formed in circumferential regions with phase shifts of substantially 90 degrees about the axis X7. The first cam surface 78a, second cam surface 78b and fourth cam surface 78d are shaped arcuate about the axis X7. The first cam surface 78a is formed with the largest radius. The second cam surface 78b is formed with the smallest radius. The fourth cam surface 78d is formed with a radius slightly larger than that of the second cam surface 78b. The third cam surface 78c is a straight surface extending between the second cam surface 78b and fourth cam surface 78d. Transition surfaces are formed between the first cam surface 78a and second cam surface 78b and between the first cam surface 78a and fourth cam surface 78d.

With each rotation through 90 degrees of the cam 98, the point of application 75e rolls on each cam surface to vary the pivotal position of control arm 75. Positions of cam 98 are detected by four sensors (which are magnetic sensors in this example) arranged at 90-degree intervals around the cam 98 for detecting a detectable element 78h attached to the cam 98. The third cam surface 78c places the second press roller 75c in close contact with the second feed roller 72. A pivotal movement of control arm 75 counterclockwise in FIG. 12 is limited by the contact of the second feed roller 72 with the second press roller 75c. In the state, the point of application 75e is lifted from the third cam surface 78c.

With each 90-degree rotation of cam 78 caused by a DC motor not shown, the second path switching guide 74 is set to the following states:

In a first state shown in FIG. 12(a), the cam 78 is turned upward, with the point of application 75e of control arm 75 supported by the first cam surface 78a. In this first state, the second press roller 75c is sufficiently separated from the second feed roller 72. At the same time, the loop guide 76 is raised to have a forward end 76b of the guide surface of loop guide 76 placed higher than a forward end 73a of fixed guide 73 leading to the cutter unit 80 and adjacent the peripheral surface of second feed roller 72. The guide surface of cutter guide 75a also is placed away from the paper transport line to the cutter unit 80. When the roll paper RP is fed from the exposure controller 40 in this state, the leading end of roll paper RP slides down the guide surface of loop guide 76, and proceeds from the fixed guide 79 into the second loop box RB2 to form a siding loop therein.

In a second state shown in FIG. 12(b), the cam 78 is turned leftward in the drawing, with the point of application 75e of control arm 75 supported by the second cam surface 78b. In this second state, the second press roller 75c remains separated from the second feed roller 72, but the guide surface of cutter guide 75a is placed to extend along the paper transport line to the cutter unit 80. The loop guide 76 is slightly inclined, with the forward end 76b of the guide surface of loop guide 76 retracted below the forward end 73a of fixed guide 73. When the roll paper RP is fed from the exposure controller 40 in this state, the leading end of roll paper RP is guided to the fixed guide 73 by the guide surface of cutter guide 75a.

To allow the loop guide 76 to move relative to and temporarily intersecting the fixed guide 73, the forward end 76b of the guide surface of loop guide 76 and the forward end 73a of fixed guide 73 are comb-shaped with teeth mutually supplementing gaps. Such a construction having teeth mutually supplementing gaps to allow a relative movement accompanying a temporary intersection is employed also between the peripheral surface of second press roller 75c and the forward end 73a of fixed guide 73.

Figure 13A:
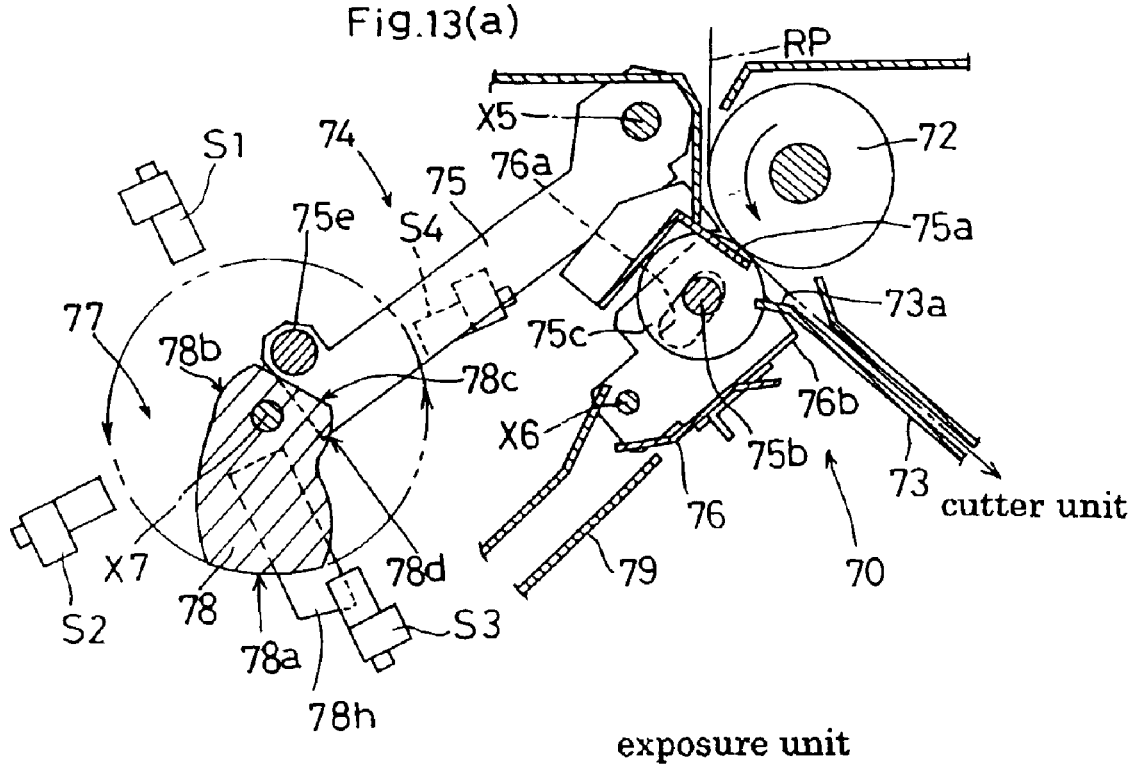
FIG. 13 is a schematic view illustrating operation of the paper transport direction switcher.

In a third state shown in FIG. 13(a), the cam 78 is turned downward in the drawing, with the point of application 75e of control arm 75 fallen adjacent the third cam surface 78c. A main region on the third cam surface 78c is closer to the axis X7 than the other cam surfaces. In this third state, the position of control arm 75 is maintained by the contact of the second press roller 75c with the second feed roller 72. However, the cutter guide 75a and loop guide 76 take essentially the same postures as in the second state. When the second path switching guide 74 is switched to the third state from the second state in which the roll paper RP is guided by the fixed guide 73, the roll paper RP remains pinched between the second press roller 75c and second feed roller 72. With a forward rotation (counterclockwise in the drawing) of the second feed roller 72, the roll paper RP is transported toward the cutter unit 80. With a backward rotation (clockwise in the drawing) of the second feed roller 72, the roll paper RP is drawn back from the cutter unit 80 toward the exposure controller 40.

Figure 13B:
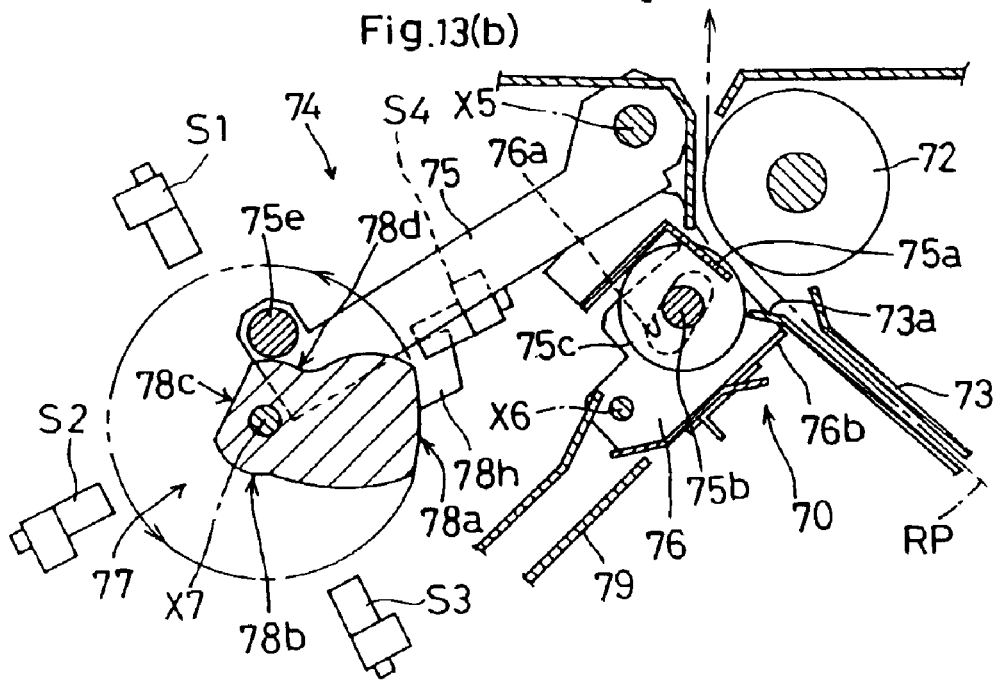

In a fourth state shown in FIG. 13(b), the cam 78 is turned rightward in the drawing, with the point of application 75e of control arm 75 supported by the fourth cam surface 78d. This fourth state is similar to the second state. The second press roller 75c is separated from the second feed roller 72 again. However, the guide surface of cutter guide 75a is placed to extend along the paper transport line to the cutter unit 80. The forward end 76b of the guide surface of loop guide 76 is retracted below the forward end 73a of fixed guide 73. In this state, the roll paper RP once fed toward the cutter unit 80 may be drawn back toward the exposure controller 40 by the exposure control roller 44 of exposure controller 40. In this fourth state, the guide surface of cutter guide 75a approaches the paper transport line to a less extent than in the second state. The reason is that the roll paper RP is drawn away from the fixed guide 73 in this state. The fourth cam surface 78d for producing this state is formed farther from the axis X7 than the second cam surface 78b, which provides a secondary effect of smoothing the transition from the fourth cam surface 78d to the first cam surface 78a.

Each cam surface has an appropriate effective length. Thus, even when the DC motor for turning the cam 78 slightly overruns a predetermined angular position, the position of the point of application 75e, and thus the angle of control arm 75, is unaffected. In the paper transport direction switcher 70, the second press roller 75c and second feed roller 72 constitute main components of the paper transport mechanism.

Cutter Unit

Figure 14:
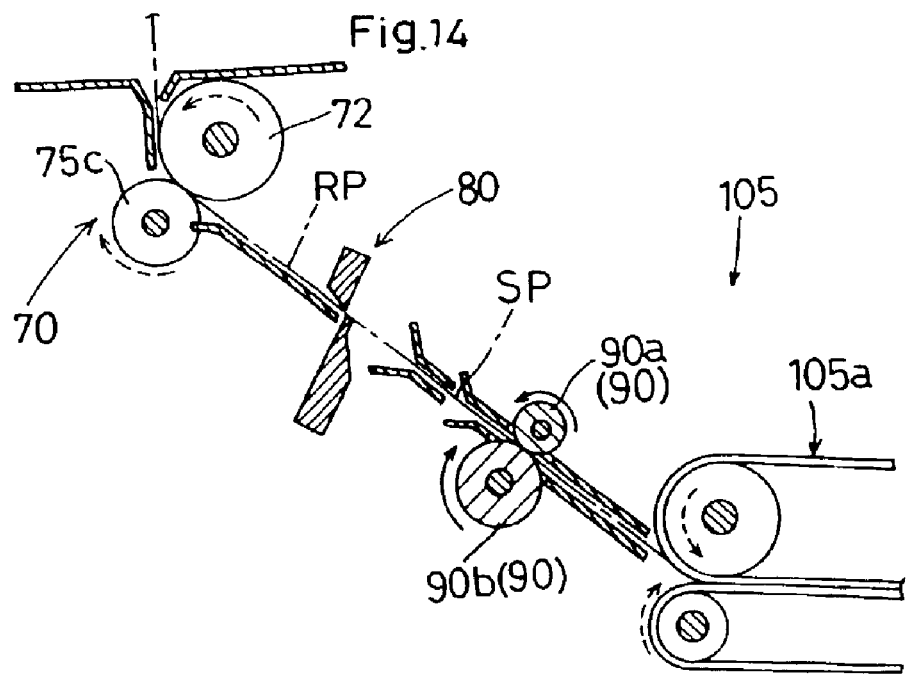
FIG. 14 is a schematic view showing a position of a cutter unit.

As shown in FIG. 14, the cutter unit 80 is disposed downstream of the paper transport direction switcher 70 for cutting the roll paper RP on the transport path. The cutter unit 80 is disposed the most downstream in the digital printing unit 1. An exit transport unit 90 is disposed on the paper transport line downstream of the cutter unit 80 for transporting cut paper SP. The exit transport unit 90 is fixed to a frame of the photo processing apparatus.

As shown in FIG. 2, downstream of the exit transport unit 90 in the paper transport direction is a cut paper transporting device 105 including a horizontal transport unit 105a adjacent the exit transport unit 90, and a vertical transport unit 105c for transporting paper SP downward from an outlet end of the horizontal transport unit 105a to an entrance of the developing unit 300. Thus, the paper SP cut by the cutter unit 80 may be transported to the developing unit 300.

Construction of Paper Centering Mechanism

Figure 15:
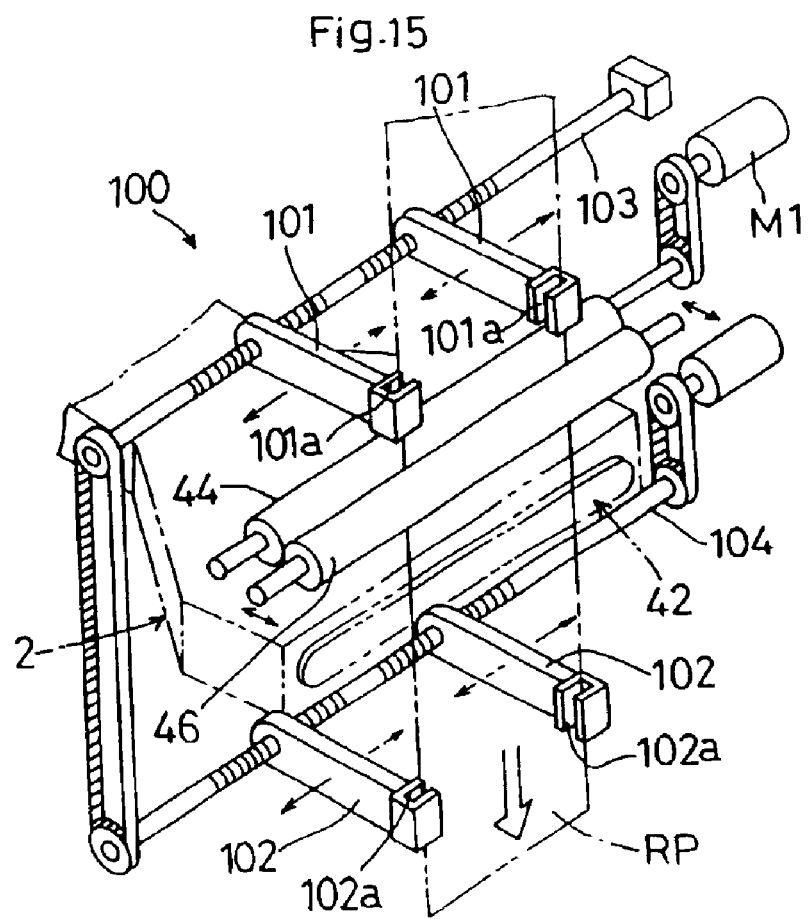
FIG. 15 is a perspective view of a paper centering mechanism.

The digital printing unit 1, as shown in FIGS. 3 and 15, includes the paper centering mechanism 100 having a pair of first movable width regulating guides 101 disposed upstream with respect to the paper transport direction of the tube surface 42 and upstream of the exposure control roller 46, and a pair of second movable width regulating guides 102 disposed downstream with respect to the paper transport direction of the tube surface 42. As shown in FIG. 15, each of the first width regulating guides 101 and second width regulating guides 102 is screwed at one end thereof on a guide rod 103 or 104 formed as a feed screw, and defines at the other end a groove 101a or 102a for receiving a side edge of the photographic paper to guide the paper transversely. The first width regulating guides 101 and second width regulating guides 102 are held against pivotal movement by slide guides not shown, and are linearly movable with rotation of guide rods 103 and 104. The guide rods 103 and 104 have feed screw portions cut in opposite directions across a horizontally middle position (center of line exposure) of the tube surface 42. With rotation of the guide rods 103 and 104, the opposed grooves 101a or 102a are movable toward or away from each other. The two guide rods 103 and 104 are interconnected through a timing belt. When one of the guide rods 104 is rotated by a stepping motor or the like, the first and second width regulating guides 101 and 102 simultaneously vary the spacing by the same amount. The middle position between the right and left regulating guides remains to coincide with the middle position of tube surface 42. In a centering operation as particularly described hereinafter, the spacing formed by each of the first and second width regulating guides 101 and 102, i.e. the guide width, is set to a passing width larger by a permissible error than the reference width of photographic paper provided by the Japanese Industrial Standard or to a centering width not exceeding the reference width of photographic paper.

Functions of the line exposure type digital printer having the above construction will be described hereinafter with reference to the schematic view shown in FIG. 16 and the flow chart shown in FIG. 17.

Figure 16:
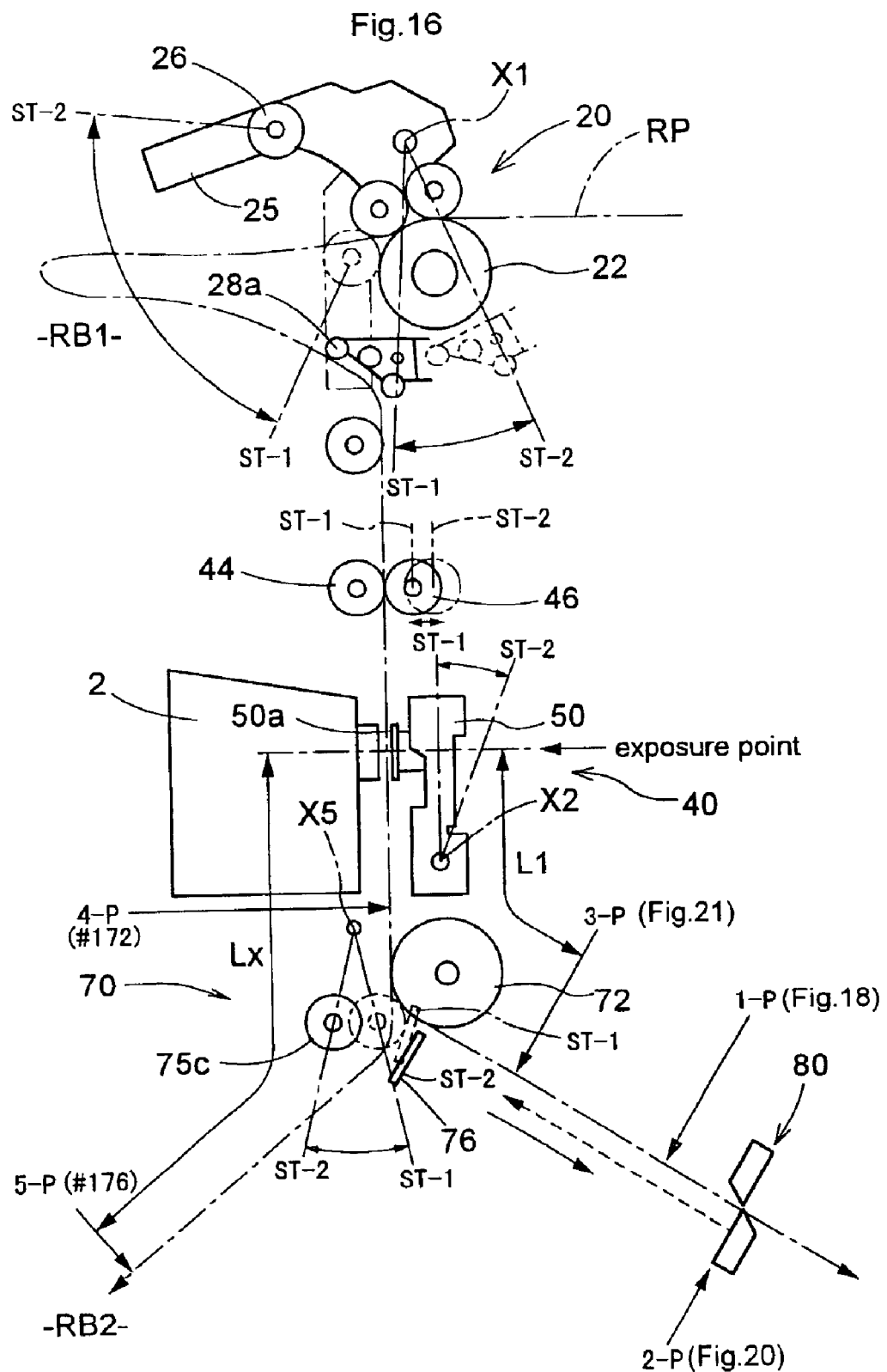
FIG. 16 is a schematic view illustrating operation of varied mechanisms on a paper transport line.
Figure 17:
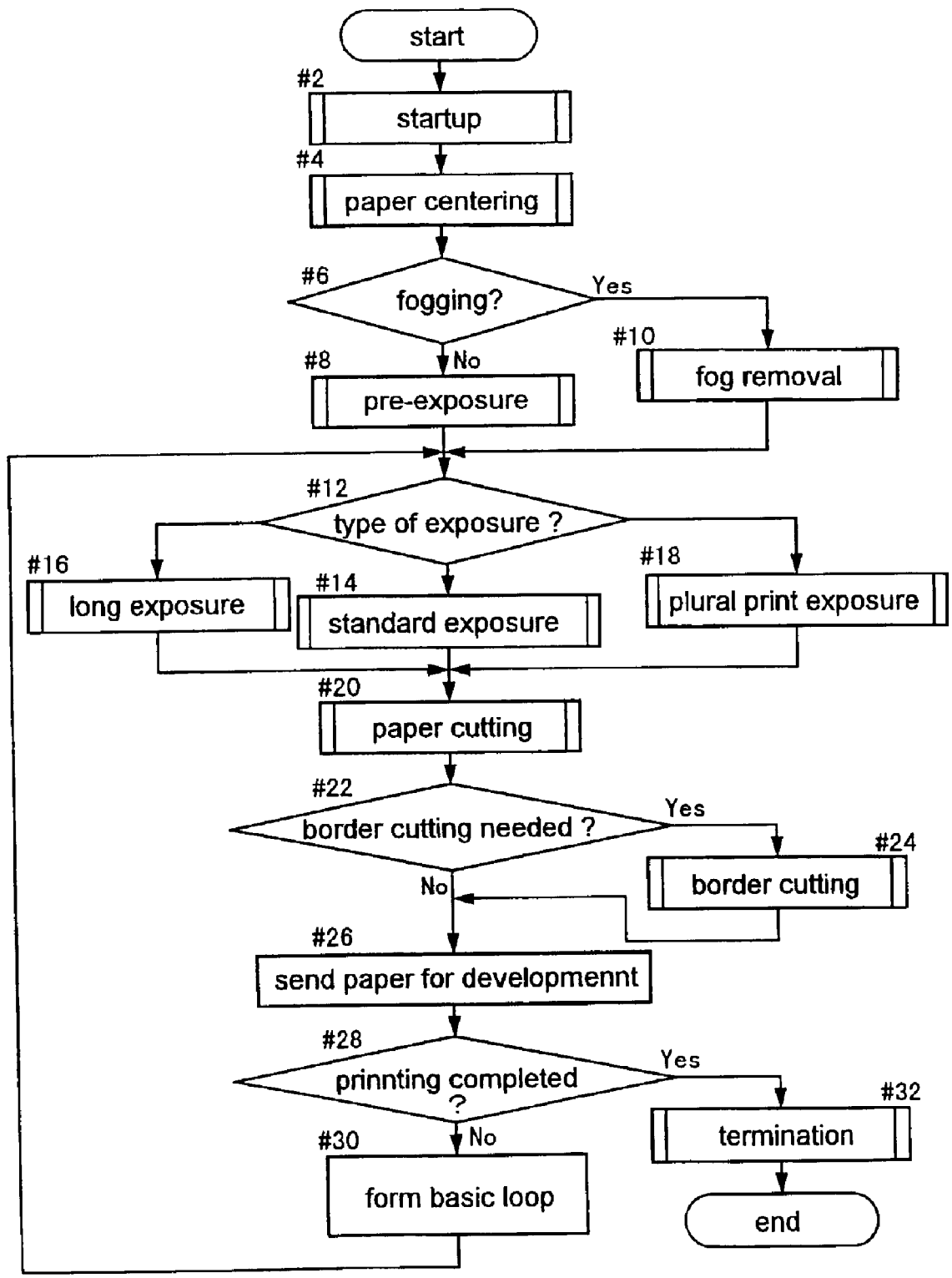
FIG. 17 is a flow chart of operation of the digital printing unit.

In the schematic view shown in FIG. 16, selective operative states of the main mechanisms are expressed by signs, solid lines and dotted lines. Regarding the paper loader 20, for example, the state of the first press roller 26 contacting the first feed roller 22 is referenced ST-1. The state of the first press roller 26 separated from the first feed roller 22 is referenced ST-2. The state of the loop roller 28a having moved across the paper transport line and entered the first loop box RB1 is referenced ST-1. The state of the loop roller 28a lying outside the first loop box RB1 is referenced ST-2.

Regarding the exposure controller 40, the state in which the press roller 46 forming part of the transport mechanism in this region contacts the exposure control roller 44 is referenced ST-1. The state of the press roller 46 separated from the exposure control roller 44 is referenced ST-2. The state of the press pad 50a pressing the roll paper RP against the tube surface 42 is referenced ST-1. The state of the press pad 50a releasing the roll paper RP is referenced ST-2. Regarding the paper transport direction switcher 70, the state of the second press roller 75c contacting the second feed roller 72 is referenced ST-1. The state of the second press roller 75c separated from the second feed roller 72 is referenced ST-2. The state of the loop guide 76 guiding the roll paper RP to the second loop box RB2 is referenced ST-1. The state of the loop guide 76 separated from the paper transport line is referenced ST-2. Further, as stopping positions of the forward end of roll paper RP, a stopping point approximately 10 mm short of the cutter unit 80 is referenced 1-P, and a stopping point on a cutting line of the cutter unit 80 is referenced 2-P. A stopping point distanced downstream in the paper transport direction from an irradiating point in the exposure unit by a standard size exposure length: L1 is referenced 3-P. A stopping point on the siding line distanced downstream in the paper transport direction by an exposure length: Lx for a predetermined number of prints in time of printing a plurality of images is referenced 5-P. Reference 4-P denotes a stopping point for the leading end of roll paper RP returned upstream of the paper transport direction switcher 70 and into the siding line for exposure other than the standard exposure.

Upon start of this line exposure type digital printer, a startup process is carried out to draw the roll paper RP out of the paper magazine and feed the paper RP until its leading end reaches the point 1-P. In this state, a loop of a predetermined amount is formed in the first loop box, which loop has a sufficient length for one exposing operation (#2). Next, a paper centering process is carried out to free the roll paper RP in the exposure region once and then to center the roll paper RP forcibly with the width regulating guides 101 and 102 (#4). Then, checking is made whether a leading end region of roll paper RP has been exposed, i.e. is fogged, or not (#6). If the leading end region is fogged, a fog removing process is carried out to cut a fogged portion at the cutter unit 80 (#10). If no fogging is found, a pre-exposure process is carried out to feed the roll paper RP so that an exposure length is substantially secured between the leading end of roll paper RP and the irradiating point in the exposure unit (#8). Subsequently, before starting an exposure process, checking is made whether this is an ordinary exposure or an exceptional exposure such as for an especially large print (which requires a large exposure distance) or for a plurality of additional prints (#12). In the case of an ordinary exposure, a standard exposure process is carried out at step #14. In the case of a large print, an exceptional length exposure process is carried out at step #16. In the case of a plurality of prints, a plural exposure process is carried out at step #18. In any case, the roll paper RP, while being drawn backward toward the first paper box, is line-exposed at the irradiating point to print images based on image data on the roll paper RP.

To transmit exposure regions of roll paper RP to the developing unit 300 as cut paper, a paper cutting process is carried out at the cutter unit (#20). During the paper cutting process, the basic loop in the first loop box RB1 is replenished with an amount corresponding to that used as prints. Checking is made whether cut paper SP needs border cutting (#22), and a border cutting process is carried out as necessary (#24). In any case, cut paper is transmitted to the developing unit 300 (#26).

This completes a series of printing processes. Then, checking is made whether a further printing operation is required (#28). When ending the printing operation, a terminating process is carried out to return the roll paper RP to the paper magazine, for example (#32). For continuing the printing operation, a basic amount of photographic paper loop is formed in the first loop box (#30), and the operation returns to #12.

Next, main processes in the processing routine shown in the flow chart of FIG. 17 will be described in detail by referring to the other flow charts.

Figure 18:
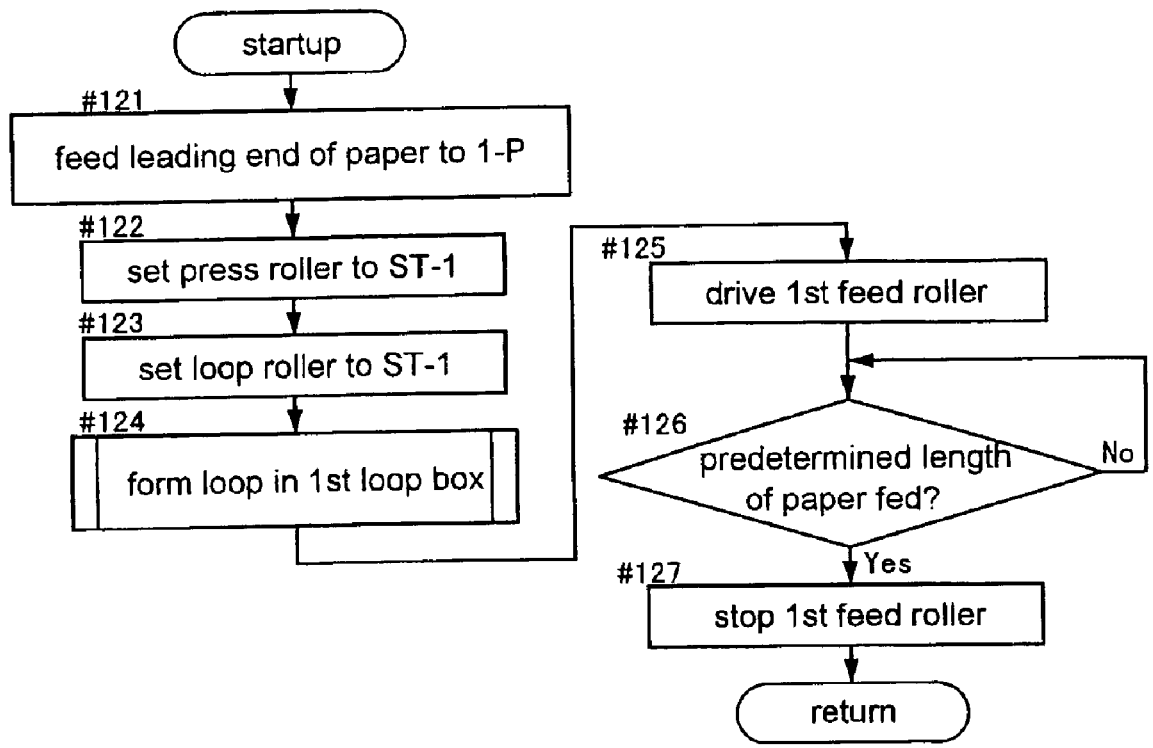
FIG. 18 is a flow chart of a startup routine.

In the startup processing routine shown in FIG. 18, the first feed roller is driven to rotate forward to feed the roll paper RP drawn out of the paper magazine PM1 until its leading end reaches point 1-P (#121). The photographic paper is transported from the paper magazine PM1 to the first feed roller 22 by the transport mechanism. Subsequently, the press roller 46 is switched to state ST-1 to pinch the roll paper RP with the exposure control roller 44 (#122). Then, the first press roller 26 is switched to state ST-2, and the loop roller 28a to state ST-1, to prepare for formation a photographic paper loop in the first loop box RB1 (#123). With the press roller 46 and exposure control roller 44 holding the roll paper RP tight, the first feed roller 22 is driven to rotate forward to feed the roll paper RP drawn out of the paper magazine PM1 into the first loop box RB1, thereby forming a loop in the first loop box RB1 (#124). The loop formation is terminated when the sensor detects the loop. The loop formed in this way is called the basic loop, and maintained as much as possible during a printing operation. The first feed roller 22 is further driven to rotate forward (#125). In this embodiment, the roll paper RP is further fed into the first loop box RB1 by a predetermined length which is 50 mm less than the length of a next print to be made (#126). Then, the first feed roller is stopped (#127).

Figure 19:
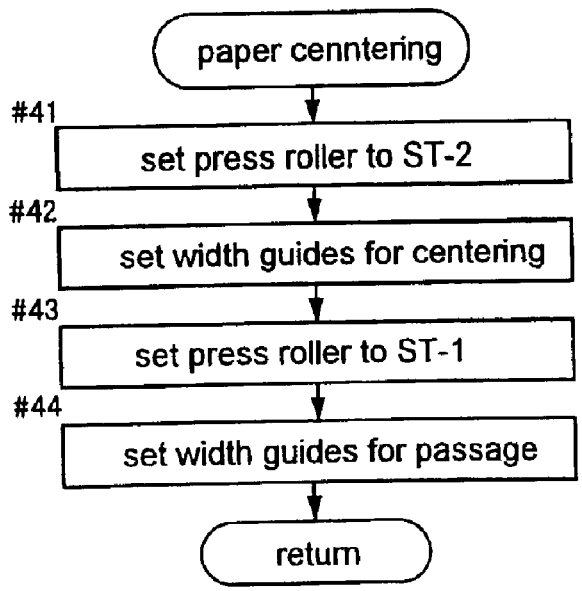
FIG. 19 is a flow chart of a paper centering routine.

In the paper centering routine shown in FIG. 19, the press roller 46 is switched to state ST-2 to form a gap with the exposure control rollers 44 to release the roll paper RP adjacent the exposure unit (#41). At this time, the guide width formed by the first width regulating guides 101 and second width regulating guides 102 is set to a predetermined value (passing width) larger by a permissible error than the reference width provided by the Japanese Industrial Standard of the photographic paper guided by the guide grooves 101a and 102a. Thus, the motor 105 is operated to set the guide width to a predetermined value (centering width) corresponding to the reference width of the photographic paper (#42). The center axis of roll paper RP is thereby forcibly brought into agreement with a middle position of the guide width formed by the first width regulating guides 101 and second width regulating guides 102. As a result, the center axis of roller paper RP coincides with a perpendicular bisector of a locus of line exposure. When the centering is completed, the press roller 46 is switched to state ST-1 to pinch the roll paper RP with the exposure control roller 44, thereby to hold the roll paper RP under pressure (#43). Thereafter the motor 105 is operated again to set the guide width formed by the first width regulating guides 101 and second width regulating guides 102 to the predetermined value (passing width) larger than the reference width (#44).

Figure 20:
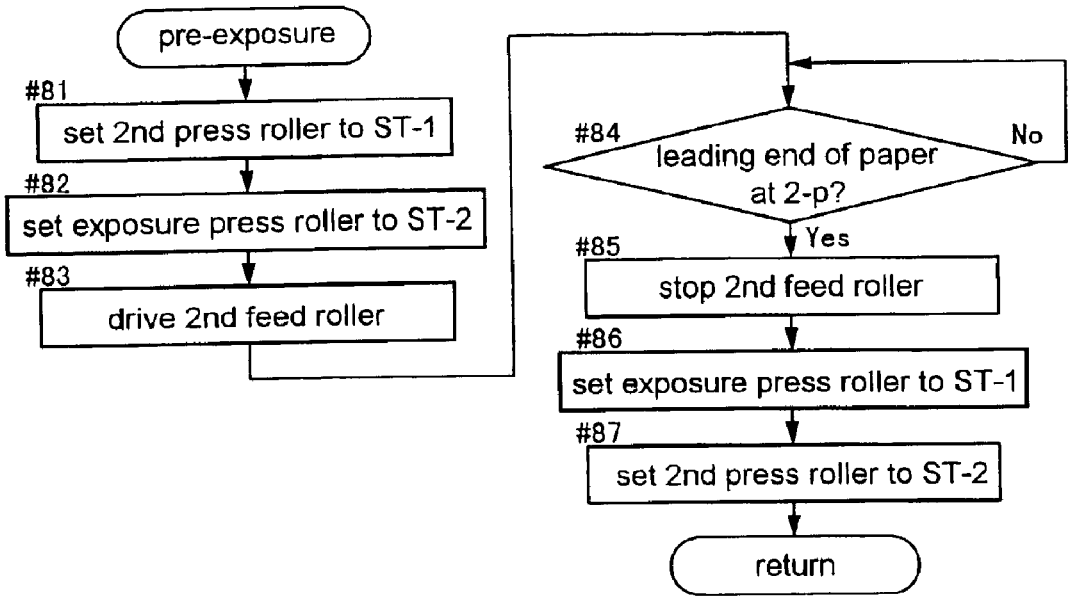
FIG. 20 is a flow chart of a pre-exposure processing routine.

In the pre-exposure processing routine shown in FIG. 20, the second press roller 75c of paper transport direction switcher 70 is switched to state ST-1 to pinch the roll paper RP with the second feed roller 72 (#81). The press roller 75c of the exposure unit is switched to state ST-2 (#82). The second feed roller 72 is driven to rotate forward (#83). Thus, the roll paper RP is transported toward the cutter unit 80. When the leading end of roll paper RP reaches the cutting line of cutter unit 80 (#84), the second feed roller 72 is stopped (#85). Next, the press roller 46 is switched to state ST-1 (#86), and the second press roller 75c is switched to state ST-2 (#87). Consequently, the exposure control roller 44 is driven to transport a next portion of roll paper RP.

Figure 21:
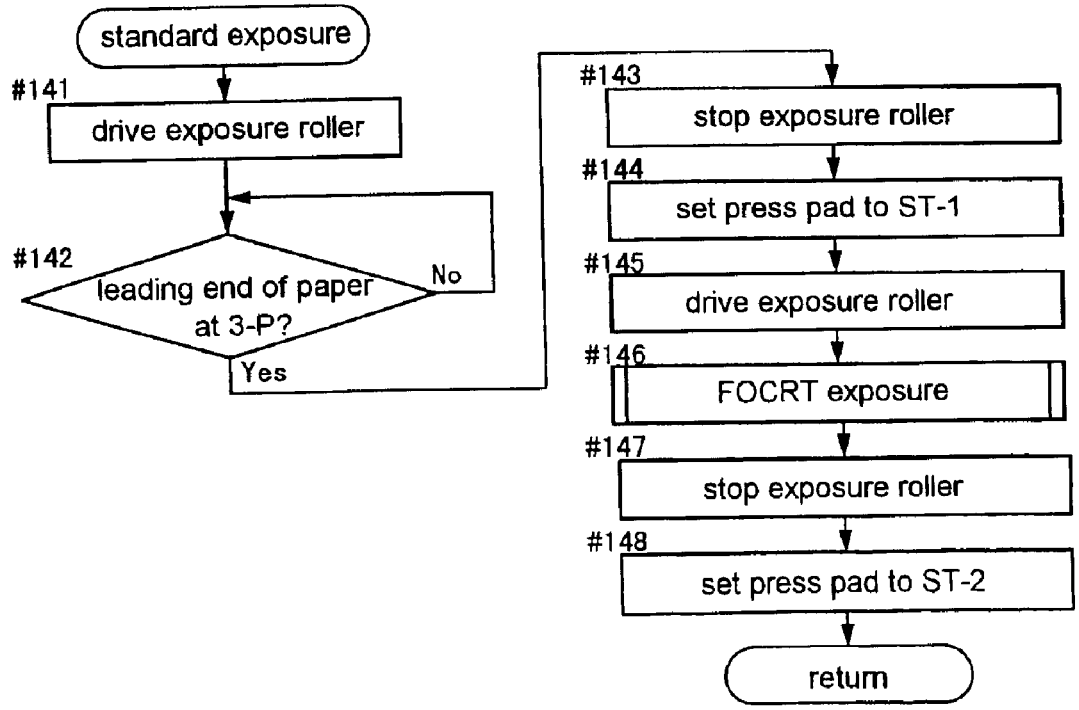
FIG. 21 is a flow chart of a standard exposure processing routine.

In the standard exposure routine shown in FIG. 21, the exposure control roller 44 is first driven backward to transport the roll paper RP backward toward the first loop box RB1 (#141). When the roll paper RP has the standard size exposure length: L1 (for making a standard print), that is when the leading end of roll paper RP reaches point 3-P, from the irradiating point in the exposure unit (#142), the exposure control roller 44 is stopped (#143). Next, the press pad 50a is switched to state ST-1 to press the emulsion surface of the photographic paper against the tube surface 42 (#144). The exposure control roller 44 is driven backward (#145). At the same time, the CRT engine 2 is driven synchronously with the operation of exposure control roller 44. A desired image is printed on the roll paper RP by repeating line exposure in which RGB light beams sweep over the roller paper RP based on image data inputted beforehand (#146). When the exposure is completed, the exposure control roller 44 is stopped (#147), the press pad 50a is switched to state ST-2 to release the roll paper RP from the tube surface 42 (#148).

In the plural exposure routine shown in FIG. 22, a console not shown is operated to instruct printing of a plurality of images, and then the forward end of roll paper RP of a length for printing these images is fed to the siding line disposed downstream in the transport direction of the irradiating point in the exposure unit, i.e. into the second loop box RB. For this purpose, the exposure control roller 44 is driven to rotate backward (#171), to return the leading end of roll paper RP to point 4-P upstream of the paper transport direction switcher 70 (#172). The exposure control roller 44 is stopped (#173), and the loop guide 76 is switched to state ST-1 for connecting the paper transport line to the siding line (#174). The exposure control roller 44 is driven to rotate forward (#175). When the roll paper RP has a length: Lx for printing the plurality of images (this length being variable with the number of prints to be made, which is computed by a controller not shown) from the leading end of roll paper RP to the irradiating point in the exposure unit, that is when the leading end of roll paper RP reaches point 5-P (#176), the exposure control roller 44 is stopped (#177). Since, at this time, the roll paper RP is drawn out longer than usual, the loop formed in the first loop box RB1 is replenished (#178). This loop replenishment is carried out concurrently with the execution of steps #175–#177.

Next, the press pad 50a is switched to state ST-1 to press the emulsion surface of the photographic paper against the tube surface 42 (#179). The exposure control roller 44 is driven backward (#180). At the same time, the CRT engine 2 is driven synchronously with the operation of exposure control roller 44. A desired image is printed on the roll paper RP by repeating line exposure in which RGB light beams sweep over the roller paper RP based on image data inputted beforehand (#181). This exposing operation is repeated for the required number of images (#182) When the exposure is all completed, the exposure control roller 44 is stopped (#183), the press pad 50a is switched to state ST-2 to release the roll paper RP from the tube surface 42. Further, the loop guide 76 is switched to state ST-2 for allowing the printed roll paper RP to be transported to the cutter unit (#185). The roll paper RP on which the plurality of images are printed is of course cut image by image, i.e. print by print, to be transported to the developing unit 300 as cut pieces of paper SP corresponding in number to the plurality of printed images.

In the exceptional length exposure routine also, as in the plural exposure routine, an increased length of roll paper RP is placed on standby downstream in the transport direction of the irradiating point of the exposure unit (toward the developing unit). The paper transport direction switcher is operated to feed the roll paper RP not toward the cutter unit, but into the second loop box to form a loop therein. An exposing operation is carried out after temporarily storing a required length of roll paper RP. This routine is different from the plural exposure routine only in excluding step #182 for repeating exposure. A value of stopping position: 5-P on the siding line and driving of CRT engine 2 are determined according to an exceptional length, i.e. a nonstandard print size.

What is claimed is:

1. A photographic paper exposing method for printing images on photographic paper drawn out of a paper storage by irradiating the photographic paper with light based on image data, said method comprising:

a first step executed for printing a plurality of images on said photographic paper, of feeding said photographic paper by a length sufficient to print said plurality of images, past an irradiating point to a position downstream thereof;

a second step of successively printing said plurality of images on said photographic paper at said irradiating point while drawing said photographic paper set at said downstream position at said first step backward to an upstream side; and a third step of feeding said photographic paper to a paper transport line extending to a developing unit.

2. An optical digital printer comprising:

a transporting mechanism for transporting photographic paper along a paper transport line extending from a paper storage to a developing unit;

an exposure unit for printing, by means of line exposure, a plurality of images on said photographic paper transported backward toward said paper storage by said transport mechanism, by irradiating said photographic paper with light based on image data;

pressing means switchable between a pressing state for pressing the photographic paper against a tube surface for said line exposure and a releasing state for releasing the paper from the pressing;

a paper bypass mechanism operable to retain the photographic paper away from said tube surface when the photographic paper is to be fed by a length sufficient to print said plurality of images thereon, past an irradiating point provided in said exposure unit to a position downstream thereof; and a cutter for cutting a part of the photographic paper exposed with said plurality of images.

3. An optical digital printer comprising:

a transporting mechanism for transporting photographic paper along a paper transport line extending from a paper storage to a developing unit;

an exposure unit for printing, by means of line exposure, a plurality of images on said photographic paper transported backward toward said paper storage by said transport mechanism, by irradiating said photographic paper with light base don image data;

paper centering means for centering the photographic paper relative to said exposure unit after the photographic paper has been fed by a length sufficient to print said plurality of images thereon, past an irradiating point provided in said exposure unit to a position downstream thereof and before the exposure is initiated; and a cutter for cutting a part of the photographic paper exposed with said plurality of images.

* * * * *